United States Patent
Asgari et al.

(10) Patent No.: US 12,039,238 B1
(45) Date of Patent: Jul. 16, 2024

(54) BLACKBOX REDUCED ORDER MODELS OF THERMAL SYSTEMS

(71) Applicant: Ansys, Inc., Canonsburg, PA (US)

(72) Inventors: Saeed Asgari, Westborough, MA (US); Xiao Hu, Ann Arbor, MI (US); Aravind Sathyanarayana, Sunnyvale, CA (US); Viralkumar Gandhi, Nashua, NH (US)

(73) Assignee: Ansys, Inc., Canonsburg, PA (US)

(*) Notice: Subject to any disclaimer, the term of this patent is extended or adjusted under 35 U.S.C. 154(b) by 965 days.

(21) Appl. No.: 16/722,574

(22) Filed: Dec. 20, 2019

(51) Int. Cl.
G06F 30/20 (2020.01)
G06F 17/16 (2006.01)
G06F 30/27 (2020.01)
G06F 119/08 (2020.01)

(52) U.S. Cl.
CPC .............. G06F 30/27 (2020.01); G06F 17/16 (2013.01); G06F 30/20 (2020.01); *G06F 2119/08* (2020.01)

(58) Field of Classification Search
CPC . G06F 30/27; G06F 17/16; G06F 7/78; G06F 2119/08; G06F 30/20; G06F 30/25; G06F 30/28
See application file for complete search history.

(56) References Cited

U.S. PATENT DOCUMENTS

| | | | | |
|---|---|---|---|---|
| 2004/0181498 | A1* | 9/2004 | Kothare | G05B 13/042 706/45 |
| 2014/0372091 | A1* | 12/2014 | Larimore | G06F 30/20 703/2 |
| 2015/0120630 | A1* | 4/2015 | Lu | G06N 3/08 700/29 |
| 2018/0202380 | A1* | 7/2018 | Wang | F02D 41/1402 |

OTHER PUBLICATIONS

Xiao Hu et al., "A linear parameter-varying model for hev/ev battery thermal modeling," 2012, Published in: 2012 IEEE Energy Conversion Congress and Exposition (ECCE), pp. 1643-1649 (Year: 2012).*

Zhidan Liu e al., "Design of gain-scheduling robust controller for aircraft engine," Jul. 27, 2019, Proceeding of the 38th Chinese control conference, pp. 870-875 (Year: 2019).*

(Continued)

*Primary Examiner* — Michael Edward Cocchi
(74) *Attorney, Agent, or Firm* — Jones Day

(57) ABSTRACT

Computationally efficient and accurate methods of fitting black box simulation data to obtain Linear Parametrically Varying models useful for design of thermal management systems are disclosed. The Linear Parametrically Varying models may be used in dynamic simulations to determine temperatures in thermal systems. A computer-implemented model is run at a plurality of fixed values of the scheduling parameter to obtain output responses to excitations of the input at the fixed values of the scheduling parameter. LTI representations are fit to the output responses, the LTI representations having state-space variables characterized by negative real poles. Coefficient matrices of the LTI representations are updated, and an LPV-ROM representation is generated.

20 Claims, 18 Drawing Sheets

(56) References Cited

OTHER PUBLICATIONS

Marco Lovera et al., "Identification for gain-scheduling: a balanced subspace approach," 2007, Proceedings of the 2007 American Control Conference, pp. 858-863 (Year: 2007).*
A. Bachnas et al., "A review on data-driven linear parameter-varying modeling approaches: A high-purity distillation col. case study," 2014, Journal of Process Control, vol. 24, pp. 272-285 (Year: 2014).*
A. Fujimori et al., "Parameter estimation of polytopic models for a linear parameter varying aircraft system," 2006, Trans. Japan Soc. Aero. Space Sci., vol. 49, pp. 129-136 (Year: 2006).*
Jan De Caigny et al., "Interpolating model identification for SISO linear parameter-varying systems," 2009, Mechanical Systems and Signal Processing, vol. 23, pp. 2395-2417 (Year: 2009).*
R. Toth, "Modeling and Identification of Linear Parameter-Varying Systems," LNCIS 403, 2010, Springer-Verlag, pp. 21-44, 171-195 (Year: 2010).*
Stefano Grivet-Talocia, "The time-domain vector fitting algorithm for linear macromodeling," 2004, International Journal of Electronics and Communications, pp. 293-295 (Year: 2004).*
M. S. Sarto et al., "On the use of fitting models for the time-domain analysis of problems with frequency-dependent parameters," 2001, 2001 IEEE EMC International Symposium, International Symposium on Electromagnetic Compatibility, pp. 588-593 (Year: 2001).*
Burak Demirel, "State-space representation of transfer function systems," 2013, https://people.kth.se/~demirel/State_Space_Representation_of_Transfer_Function_Systems.pdf, 5 pages (Year: 2013).*
"Understanding Poles and Zeros," Massachusetts Institute of Technology Department of Mechanical Engineering 2.14 analysis and design of feedback and control systems, downloaded from WaybackMachine Feb. 18, 2018, pp. 1-13 (Year: 2018).*
Saeed Asgari et al., "A Linear Parameter Varying Combined with Divide-and-Conquer Approach to Thermal System Modeling of Battery Modules," SAE International Journal of Alternative Powertrains—May 2016, 16 pages (Year: 2016).*
Hu, Xiao, et al. "A transient reduced order model for battery thermal management based on singular value decomposition." 2014 IEEE Energy Conversion Congress and Exposition (ECCE). IEEE, 2014. (Year: 2014).*

* cited by examiner

BLACKBOX REDUCED ORDER MODELS OF THERMAL SYSTEMS

TECHNICAL FIELD

The present disclosure relates to physical system modeling and simulation including temperature estimation in and around heat generating systems such as batteries and circuit boards.

BACKGROUND

Modern battery packs and circuit boards must pack energy dissipating elements in highly dense configurations to meet ever-tightening space constraints. Computer-Aided Design (CAD) is an essential tool in the design of thermal management strategies to ensure components will perform as expected under ordinary operating conditions (for example to meet expected battery lifetime or achieve nominal transistor performance). The most common CAD strategies—based on finite element or finite volume simulations of heat and mass transfer over detailed system geometries—enable designers to study a small number of detailed temperature profiles, but are too computationally expensive for use in modeling that would require re-computing the temperature profile many times for different inputs, as would be necessary, for example, to dynamically simulate an overall system including ancillary sub-systems such as thermal management sub-systems. As a result, current CAD methods may require engineers to overdesign systems to build in safety margins that might not be needed if engineers could fully probe overall system behavior.

Computationally tractable approaches to total system modeling will require simplified models for temperature estimation. One promising approach has been to use rigorous CAD models (such as the above-noted finite element or finite volume methods) to generate training data for a simpler model with fewer degrees of freedom such as a linear parametrically varying (LPV) model with one or more discrete inputs and one or more discrete outputs. Such models are computationally fast and structured to be readily integrated with other dynamic models, especially in the context of control systems. LPV model parameters can be optimized to approximate rigorous CAD computations at simplified or averaged inputs that are determined from boundary conditions applicable to the rigorous models.

Methods of constructing LPV models have been provided in the prior art. In one such method, for example, the LPV model may be constructed as a weighted combination (for example an interpolation) of separately-fitted Linear Time-Invariant (LTI) state-space models. In this method, training data for different input(s) and parameter(s) are obtained and separately fitted to the LTI models, and at simulation time a combination of the models is dynamically selected based on the value of the parameter(s) in effect at a given point in time of the simulation. In practice, this approach has been plagued by several difficulties. Due to the dynamic dependence of the forced convection physics in thermal management systems of interest, state-space models computed at different coolant flow rates can be inconsistently structured (due to differing state-space representations) and therefore poor candidates for use as local model constituents of the LPV models. Moreover, certain matrix transformations intended to harmonize LTI models can arbitrarily apply different sign conventions between LTI models, making interpolation difficult.

In a second method of constructing an LPV model, training data that spans the intended range of input(s) and parameter(s) is directly fitted to the LPV model. While, in principle, this approach can mitigate consistency problems, the fitting problem is a complex nonlinear optimization which may be difficult to solve. In addition, the method can fail to accurately incorporate the effects of time-varying mass flow rates of cooling medium without requiring an excess number of state-space variables that effectively over-fit the LPV model to achieve the target accuracy. Accordingly, in both modeling methods, improvements are needed.

SUMMARY

The present disclosure describes new and computationally efficient methods and systems suited for the design of thermal management systems with the complex dynamics associated with densely-packed heat generating elements. Certain embodiments may provide, for example, a method for constructing a Linear Parameter Varying-Reduced Order Model (LPV-ROM) representation based on simulation results from detailed CAD simulations of a physical system. In certain embodiments, for example, the method may comprise providing a computer-implemented model configured to simulate outputs (for example temperature at one or more locations about the physical system) in response to an input (for example an energy input) and a scheduling parameter (for example a flow rate of coolant provided to the physical system). In certain embodiments, for example, the method may comprise running the computer-implemented model at a plurality of fixed values of the scheduling parameter to obtain output responses to excitations of the input at the fixed values of the scheduling parameter. In certain embodiments, for example, the method may comprise fitting Linear Time Invariant-Reduced Order Model (LTI-ROM) representations to the output responses. In certain embodiments, for example, the LTI-ROM representations may comprise state-space variables. In certain embodiments, for example, the LTI-ROM representations may be characterized by negative real poles. In certain embodiments, for example, the LTI-ROM representations may be stable. In certain embodiments, for example, the state-spaces of the LTI-ROM representations may be reoriented into alignment with one another. In certain embodiments, for example, the reorienting of the state-spaces may comprise updating coefficient matrices (for example system matrices, control matrices, and/or feedforward matrices) of the LTI-ROM representations. In certain embodiments, for example, the updating may comprise rearranging the coefficient matrices so that the poles appear in ascending or descending arrangements in the coefficient matrices. In certain embodiments, for example, the updating may comprise applying balancing transformations (for example balancing transformations that adjust controllability Gramians and observability Gramians of the LTI-ROM representations) to the coefficient matrices. In certain embodiments, for example, the updating may comprise detecting and removing sign changes in the LTI-ROM representations caused by the balancing transformations. In certain embodiments, for example, the method may comprise constructing an LPV-ROM representation that includes the scheduling parameter, comprising: multiplying the updated coefficient matrices by interpolation functions (for example piecewise linear interpolation functions) for the scheduling parameter. In certain embodiments, for example, the foregoing method may be repeated with an increased number of the state-space variables if a measure of prediction error (for example a Euclidean norm of prediction errors) of the LPV-ROM representation exceeds a predetermined threshold.

In certain embodiments, for example, the LPV representation may comprise a canonical form. In certain embodiments, for example, the canonical LPV representation may comprise a diagonal system matrix. In certain embodiments, for example, LPV representation may comprise an input matrix that consists of a column vector of 1's or a block diagonal matrix of 1's. In certain embodiments, for example, the LPV representation may comprise a block-matrix combination of LPV representations generated for excitations of different inputs. In certain embodiments, for example, the number of state-space variables may be between 2 and 8 state-space variables.

In certain embodiments, for example, the excitation of the input may be a step input. In certain embodiments, for example, the fitting may comprise time domain vector fitting. In certain embodiments, for example, the LPV representation may comprise real, negative poles over a predetermined range of the scheduling parameter.

In certain embodiments, for example, the measure of prediction error of the LPV-ROM representation may comprise a norm of the differences between output predictions of the LPV-ROM representation and output responses of the training data. In certain embodiments, for example, the interpolation functions may be piece-wise linear functions.

Certain embodiments, for example, may be exclusive of the generation of LTI representations. Certain embodiments may provide, for example, a method for directly generating a Linear Parameter Varying-Reduced Order Model (LPV-ROM) representation for a physical system. In certain embodiments, for example, a canonical form of the LPV-ROM representation may be selected to reduce the difficulty of fitting the LPV-ROM to training data. In certain embodiments, for example, the LPV-ROM representation may comprise a constant input matrix (for example a block matrix of 1's wherein each block corresponds to a different input). In certain embodiments, for example, a different set of state-space variables is used to model each input. In certain embodiments, for example, the method may comprise providing a computer-implemented LPV-ROM representation having N state-space variables. In certain embodiments, for example, the LPV-ROM representation may comprise the following equations:

$$\frac{dx(t)}{dt} = A(\rho)x(t) + Bu(t) \qquad \text{Equation I}$$

$$y(t) = C(\rho)x(t) + D(\rho)u(t) \qquad \text{Equation II:}$$

where: t is time, $\rho$ is a scheduling parameter of the physical system, x is an N-dimensional vector of the state-space variables, u is a vector of one or more inputs to the physical system, y is a vector of outputs from the physical system, A is an N-by-N diagonal matrix of real first functions of $\rho$, B is a column vector or matrix of constant coefficients, C is a matrix of real second functions of $\rho$, and D is a column vector or matrix of real third functions of $\rho$. In certain embodiments, for example, the method may comprise providing training data for the physical system that provide output responses to one or more step inputs and dynamic variations in $\rho$ over a predetermined range of $\rho$. In certain embodiments, for example, the method may comprise providing further training data for the physical system that provide further output responses to a further one or more step inputs at a plurality of fixed values of $\rho$ that spans the predetermined range. In certain embodiments, for example, the method may comprise optimizing coefficients in A to obtain optimized A coefficients. In certain embodiments, for example, optimizing the coefficients in A may comprise iteratively solving the LPV-ROM representation to reduce a first global measure of prediction error between the LPV-ROM representation and the training data. In certain embodiments, for example, the method may comprise further optimizing coefficients in C and coefficients in D. In certain embodiments, for example, the further optimizing may comprise minimizing a second global measure of prediction error between the LPV-ROM representation, given the optimized A coefficients, and the training data, subject to constraints on local measures of prediction errors between the LPV-ROM representation and the further training data. In certain embodiments, for example, the method may comprise repeating the methods of providing training data and optimizing coefficients in the matrices with an increased value of N if the second global measure exceeds a predetermined tolerance.

In certain embodiments, for example, the real first functions of $\rho$ may be polynomials of $\rho$ of order up to 3. In certain embodiments, for example, the LPV representation may comprise an input matrix that consists of a column vector of 1's. In certain embodiments, for example, the LPV representation may be a block-matrix combination of LPV representations generated for excitations of different inputs.

In certain embodiments, for example, the excitation of the input may be a step input. In certain embodiments, for example, the fitting may comprise time domain vector fitting. In certain embodiments, for example, the LPV representation may comprise real, negative poles over a predetermined range of the scheduling parameter. In certain embodiments, for example, the real second functions of $\rho$ and the real third functions of $\rho$ may be polynomials of $\rho$ of order up to 3.

In certain embodiments, for example, the iteratively solving the LPV-ROM may comprise iteratively solving Equation I for trial values of A to obtain trail solutions to x, followed by solving Equation II using the trial solutions to x as inputs to obtain trial outputs y.

In certain embodiments, for example, the first global measure of prediction error between the LPV-ROM and the training data comprises a norm of the differences between the trial outputs y and the output responses of the training data.

Certain embodiments may provide, for example, a method for constructing a Linear Parameter Varying-Reduced Order Model (LPV-ROM) representation of a physical system (for example an electronics package or a battery pack in communication with a supply of coolant), comprising: i) providing a computer-implemented model configured to simulate outputs of the physical system in response to an input and a scheduling parameter; ii) running the computer-implemented model at a plurality of fixed values of the scheduling parameter to obtain output responses to excitations of the input at the fixed values of the scheduling parameter; iii) fitting Linear Time Invariant representations (LTI representations) to the output responses, the LTI representations having state-space variables characterized by negative real poles; iv) updating coefficient matrices of the LTI representations, comprising: a) rearranging the coefficient matrices so that the poles appear in ascending or descending arrangements in the coefficient matrices; b) applying balancing transformations to the coefficient matrices; and c) detecting and removing sign changes in the LTI representations caused by the balancing transformations; v) constructing an LPV- ROM representation that includes the scheduling parameter, comprising: multiplying the updated coefficient matrices by interpolation functions for the scheduling parameter; and vi) repeating steps iii-v with an increased number of the state-space variables if a measure of prediction error of the LPV-ROM representation relative to given (local) training data exceeds a predetermined threshold.

Certain embodiments may provide, for example, a method for directly generating a Linear Parameter Varying-Reduced Order Model (LPV-ROM) representation of a physical system, comprising: i) providing: a) a computer-implemented LPV-ROM representation having N state-space variables, comprising the following equations:

$$\frac{dx(t)}{dt} = A(\rho)x(t) + Bu(t) \quad \text{Equation I}$$

$$y(t) = C(\rho)x(t) + D(\rho)u(t) \quad \text{Equation II:}$$

where: t is time, $\rho$ is a scheduling parameter of the physical system, x is an N-dimensional vector of the state-space variables, u is a vector of one or more inputs to the physical system, y is a vector of outputs from the physical system, A is an N-by-N diagonal matrix of real first functions of $\rho$, B is a column vector or matrix of constant coefficients, C is a matrix of real second functions of $\rho$, and D is a column vector or matrix of real third functions of $\rho$; b) training data for the physical system that provide output responses to one or more step inputs and dynamic variations in $\rho$ over a predetermined range of $\rho$; and c) further training data for the physical system that provide further output responses to a further one or more step inputs at a plurality of fixed values of $\rho$ that spans the predetermined range; ii) optimizing coefficients in A to obtain optimized A coefficients, comprising: iteratively solving the LPV-ROM representation to reduce a first global measure of prediction error between the LPV-ROM representation and the training data; iii) further optimizing coefficients in C and coefficients in D, comprising: minimizing a second global measure of prediction error between the LPV-ROM representation, given the optimized A coefficients, and the training data, subject to constraints on local measures of prediction errors between the LPV-ROM representation and the further training data; and iv) repeating steps i-iii with an increased value of N if the second global measure exceeds a predetermined tolerance.

This section summarizes some aspects of the present disclosure and briefly introduces some preferred embodiments. Simplifications or omissions in this section as well as in the abstract and the title herein may be made to avoid obscuring the purpose of the section. Such simplifications or omissions are not intended to limit the scope of the present disclosure.

The disclosed methods and systems comprise new and computationally efficient ways to generate more consistent and therefore more reliable state-space representations of physical systems with complex dynamics. Representations that attempt to combine two or more state-space representations are plagued by inconsistencies between the two or more representations. When the individual representations are generated independently from one another, for example, the state-space variables in each representation may not naturally align. First, there is no way to know a priori which state-space variables in a first representation correspond to which state-space variables in a second representations. Second, the coordinate systems of each state-space representation may differ, thereby preventing the state-space variables from naturally lining up across the different representations. In certain embodiments, for example, the present methods may provide ways to reorient the different state-space representations into alignment, enabling more effective combination to form an overall state-space representation.

Previous approaches that attempt to adapt LPV-ROM representations directly to training data (for example without the generation of intermediate LTI-ROM representations) may require solution of highly nonconvex optimization problems to identify model parameters. In certain embodiments, for example, the present methods may exploit particular forms of LPV-ROM representations to pose more tractable optimization problems, thereby improving the ability to fit training data as well as to increase computational efficiency. In particular, LPV-ROM representations may be selected that reduce nonlinear interactions between poles and residues of the representations, enabling improved solution methods. In addition, the LPV-ROM representations may allow different input contributions to be generated separately, enabling parallelization of the solution methods across multiple computing machines.

Certain embodiments may provide, for example, methods for simulating physical systems of interest using any of the LPV-ROM representations disclosed herein. In certain embodiments, for example, the methods may comprise receiving data characterizing a thermal management system (for example scenarios for one or more rates of energy input and one or more parameters characterizing flow of a coolant such as air). In certain embodiments, for example, the method may further comprise applying the received data to an LPV-ROM representation to generate LPV model results that characterize a thermal behavior of the thermal management system. In certain embodiments, for example, the method may comprise providing output data characterizing the LPV model results. In certain embodiments, for example, the method may comprise displaying the output data, loading the output data into a computer memory, storing the output data into a physical persistence, and transmitting the output data to a remote computing system.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

The present disclosure describes methods that address problems in the generation of reduced order models by exploiting the special structural and stability characteristics of physical systems of interest, including controlled devices such as air-cooled electronics packages and battery packs. In one aspect of the present disclosure, state-space representations of independently fitted LTI representations may be aligned and interpolation functions may be introduced to form improved LPV representations. In another aspect of the present disclosure, stability characteristics of problem structures are exploited to directly obtain improved LPV representations without the need to generate intermediate LTI representations. In both aspects, cases involving multiple inputs can be parallelized with separate training data and LPV representations can be generated for each input, and the results combined to form an overall LPV representation comprising all of the inputs.

Figure 1:
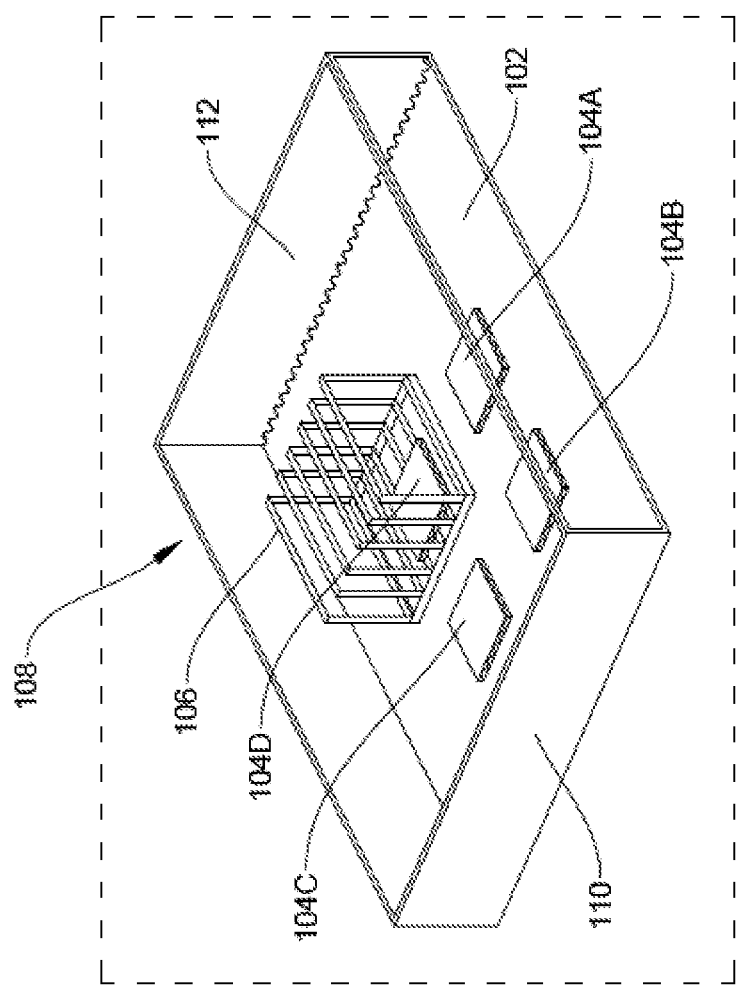
FIG. 1 is a simplified diagram of an electronics package.

Certain embodiments may provide, for example, a method of constructing a Linear Parameter Varying-Reduced Order Model (LPV-ROM) of a physical system. A first exemplary physical system comprising an electronics package 100 with heat generating and heat removing elements is depicted in FIG. 1. A printed circuit board 102 comprising field effect transistors FETA 104A, FETB 104B, FETC 104C, and FETD 104D in communication with heat sinks (such as heat sink 106) is contained in enclosure 108 having an inlet 110 and an outlet for a cooling medium (such as air). A second exemplary physical system comprising a battery pack 200 that includes a stack of heat generating battery cells 202 is depicted in FIG. 2.

Figure 2:
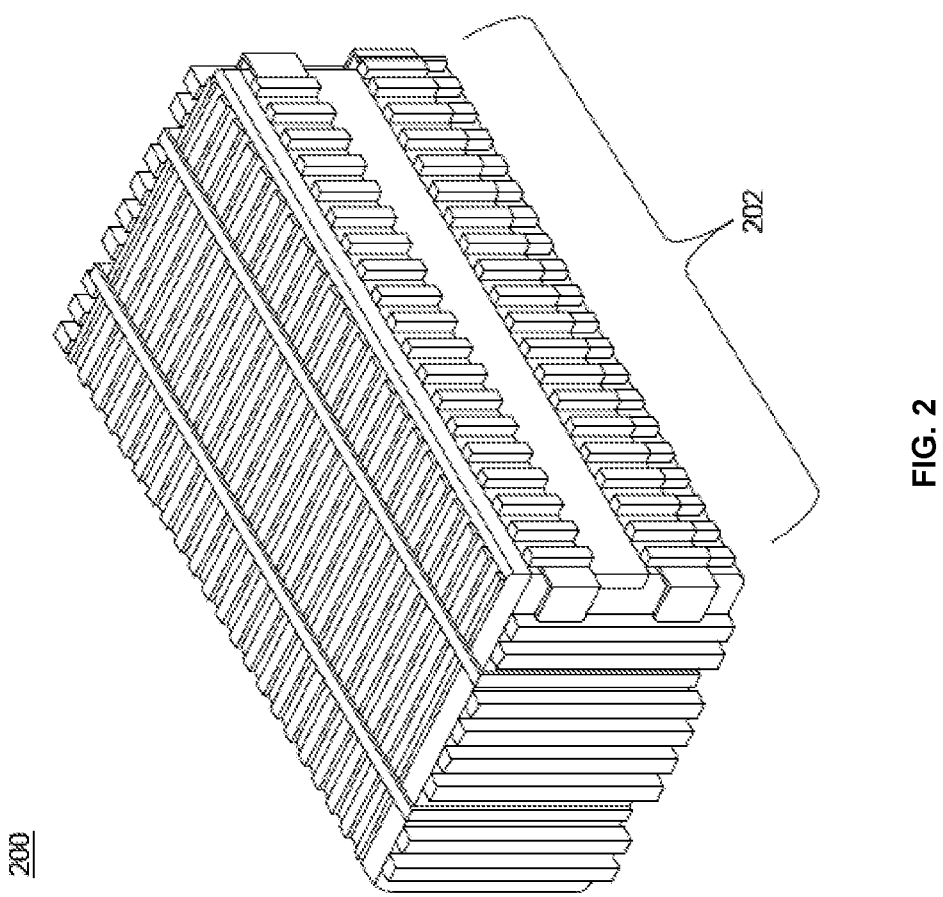
FIG. 2 is a simplified diagram of a battery pack.

Physical systems such as those depicted in FIGS. 1 and 2 can be modeled using sophisticated computational fluid dynamics packages (for example packages such as those sold under the trade names ICEPAK, TWINBUILDER, and FLUENT) to provide detailed transient profiles of temperature and fluid flow about the system geometry. Such approaches, however, may be too computationally intensive in certain modeling situations, for example when it is desired to integrate a model of the system with models of other systems, particularly in dynamic simulations that include control feedback loops. In systems such as those depicted in FIG. 1 or FIG. 2, for example, it may be desirable to simulate a system model in combination with a cooling fan model to determine whether a dynamic operating range of the fan provides sufficient air flow to cool the system for time-varying, heat-generating input(s). In the case of the electronics package 100, for example, electrical consumption by the electronics package 100 may be used as an input, while in the case of the battery pack 200, for example, a profile of a load demand placed on the battery pack 200 may be used as an input.

Figure 3:
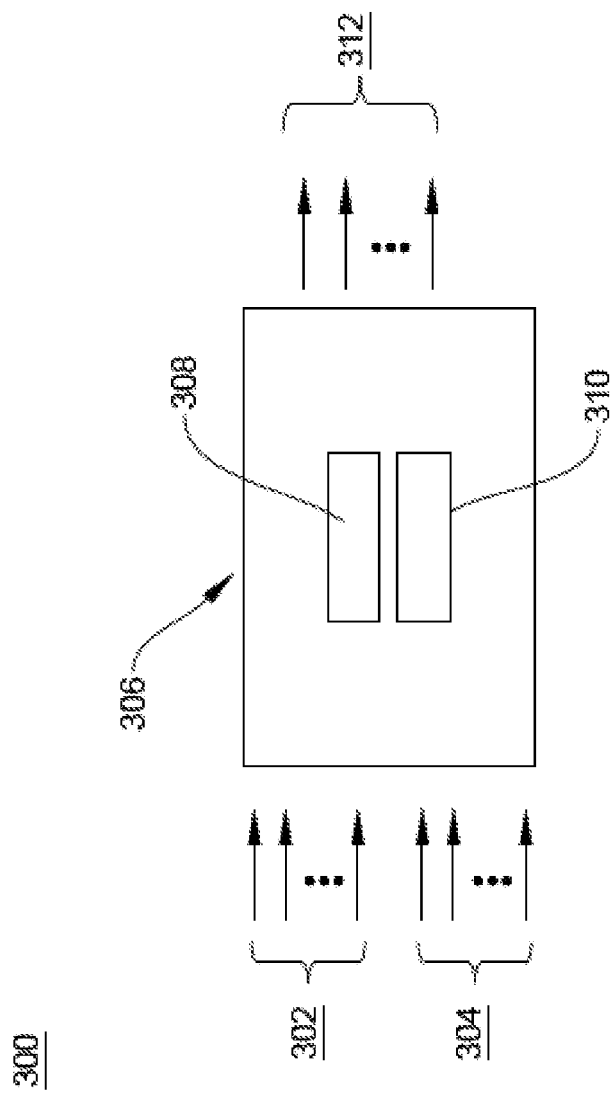
FIG. 3 is a schematic depiction of a reduced order model.

For such computationally intensive applications, it may be desirable to reduce the computational complexity of mathematical models in numerical simulations through metamodeling or reduced order modeling, which approximates the original model through techniques that reduce model dimensionality. FIG. 3 schematically depicts a reduced order model 300 in which one or more inputs 302 (for example one or more profiles of electrical consumption by the electronics package 100) and one or more scheduling parameters 304 (for example one or more mass flow rate of air over the electronics package 100) are inputted to a reduced order model 306 comprising a number of dynamic state-space variables 308 and model coefficients 310. In certain embodiments, for example, the model coefficients 310 may be dependent on both the one or more inputs 302 and the one or more scheduling parameters 304. In certain embodiments, for example, the model coefficients 310 may be dependent on the one or more scheduling parameters 304 but may be independent of the one or more inputs 302. In response to time-varying excitations of the one or more inputs 302 and time-varying values of the one or more scheduling parameters 304, the model 306 may generate one or more outputs 312 (for example one or more time-varying temperature profiles at one or more locations about the electronics package 100). In certain embodiments, for example, the reduced order model 306 may be a Single Input-Single Output (SISO) model. In certain embodiments, for example, the reduced order model 306 may be a Multiple Input-Single Output (MISO) model. In certain embodiments, for example, the reduced order model 306 may be a Single Input-Multiple Output (SIMO) model. In certain embodiments, for example, the reduced order model 306 may be a Multiple Input-Multiple Output (MIMO) model.

In certain embodiments, for example, the reduced order model (ROM) of the physical system may be a Linear Parameter Varying-Reduced Order Model (LPV-ROM) representation such as the following:

$$\frac{dx(t)}{dt} = A(\rho(t))x(t) + B(\rho(t))u(t)$$

$$y(t)=C(\rho(t))x(t)+D(\rho(t))u(t)$$

where: t is time, ρ is a vector of the one or more scheduling parameters 304, x is an N-dimensional column vector of the one or more (N) state-space variables 308, u is a column vector of the one or more inputs 302, y is an R-dimensional column vector of the one or more (R) outputs 312, A is an N-by-N system matrix comprising functions of ρ, B is an input matrix, C is an R-by-N control matrix, and D is a feedforward matrix. The matrices A-D comprise the model coefficients 310.

Figure 4:
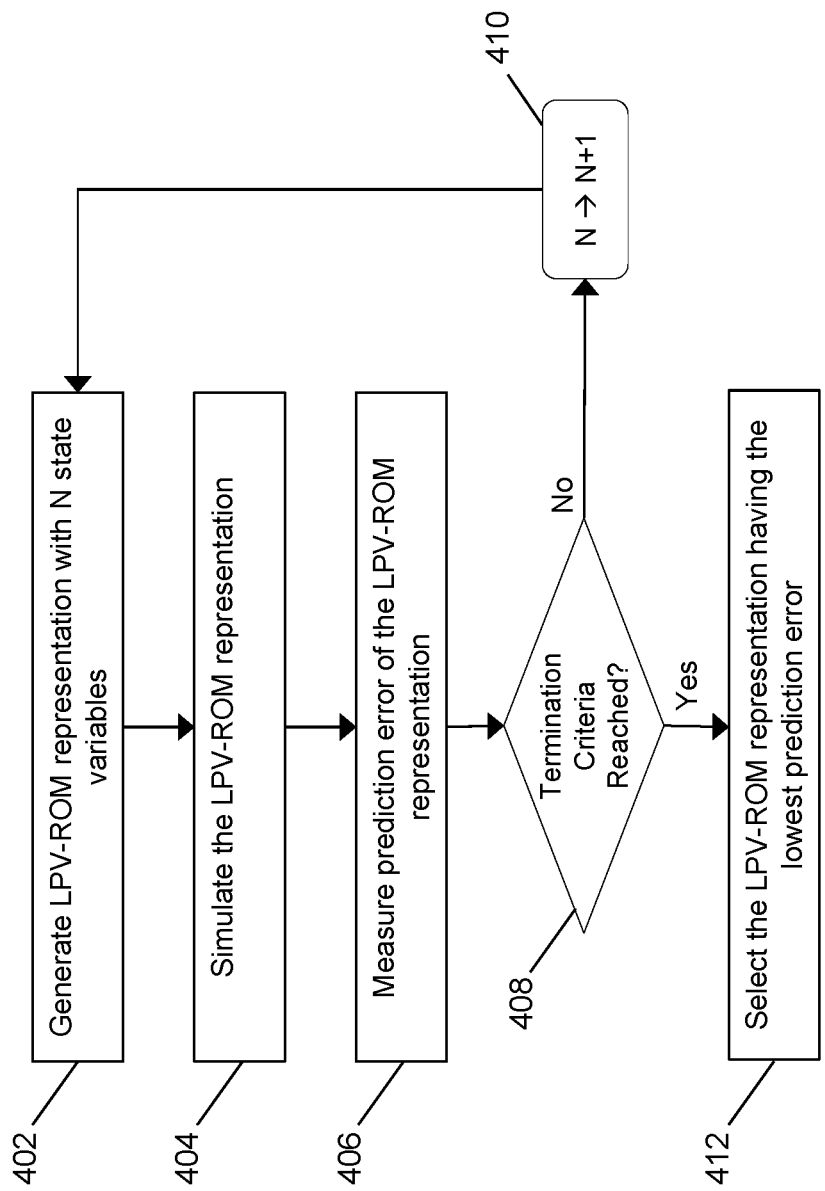
FIG. 4 is flowchart illustration of a method to construct an LPV-ROM.

In certain embodiments, for example, an LPV-ROM representation may be fitted to output data (i.e., training data) obtained for selected scenarios of the one or more inputs and the one or more scheduling parameters. While the resulting fitted LPV-ROM representation can simplify and speed up simulation of a complex physical process, the representation may only approximate the physical process. For given training data, one may potentially increase the accuracy of an LPV-ROM representation by increasing the number of state-space variables (and accompanying model parameters) to increase the ability of the representation to emulate higher order nonlinearities and dynamics in the underlying physical system. However, care must be taken to avoid overfitting the model with too many state-space variables, which may introduce computational artifacts that reduce model robustness (i.e., that reduce accuracy of the representation when applied to novel scenarios of the one or more inputs and the one or more scheduling parameters). A flowchart depiction of a method 400 for balancing the accuracy of a fit to training data with model robustness is shown in FIG. 4. An LPV-ROM with N state-space variables is generated 402 using one or more of the methods disclosed herein, and the generated LPV-ROM representation then simulated 404 with selected scenarios of the one or more inputs and one or more scheduling parameters to obtain time series of the one or more outputs. These results are combined with training data (for example experimental data or data obtained from a detailed simulation of the physical system) to measure 406 the prediction error of the LPV-ROM representation and termination criteria evaluated 408. If termination criteria have not been reached, the number of state-space variables is increased 410. If termination criteria have been reached, a final LPV-ROM is selected 412. In certain embodiments, for example, the method 400 may be initialized by selecting an initial number of state-space variables (i.e., an initial value for N). In certain embodiments, the initial value of N may be 1. In certain embodiments, the initial value of N may be 2. In certain embodiments, the initial value of N may be 3.

Running the LPV-ROM Representation (404)

Given a generated LPV-ROM representation, any available method for running 404 the LPV-ROM representation may be used to obtain LPV-ROM predictions that can be compared for prediction error between the LPV-ROM representation and the training data. In certain embodiments, for example, the LPV-ROM representation and the training data may be based on scenarios for the one or more inputs and the one or more scheduling parameters. In certain embodiments, for example, the same scenarios used to generate the LPV-ROM representation (and the training data) may be used to simulate the LPV-ROM representation. In certain embodiments, for example, the LPV-ROM representation may be simulated with novel scenarios (for example scenarios that are different from the scenarios used to generate the LPV-ROM representation) of the one or more inputs and the one or more scheduling parameters, or with a combination of the novel scenarios and one or more (for example all) of the scenarios used to generate the LPV-ROM representation. In certain embodiments, for example, the LPV-ROM may be simulated with scenarios comprising time-dependent scenarios (for example excitations) of the one or more inputs with fixed values for the one or more scheduling parameters. In certain embodiments, for example, the LPV-ROM may be simulated with scenarios comprising time-dependent scenarios for both the one or more inputs and the one or more scheduling parameters. In certain embodiments, for example, the LPV-ROM may be simulated with scenarios comprising time-dependent scenarios for the one or more inputs that together span a dynamic range of the one or more inputs for the physical system. In certain embodiments, for example, the LPV-ROM may be simulated with scenarios comprising time-dependent scenarios for the one or more scheduling parameters that span a dynamic range of the one or more scheduling parameters for the physical system. In certain embodiments, for example, the LPV-ROM may be simulated with scenarios in which at least one (for example all) of the inputs are separately excited (for example other inputs, if any, are not excited) in at least a first one of the scenarios. In certain embodiments, for example, the separate excitations may comprise step response excitations or any of the excitations disclosed herein. In certain embodiments, for example, the LPV-ROM may be simulated with scenarios with multiple inputs in which at least two of the multiple inputs are excited in at least a first one of the scenarios. In certain embodiments, for example, the LPV-ROM may be simulated with scenarios comprising sinusoidal oscillations of the one or more scheduling parameters. In certain embodiments, for example, the LPV-ROM may be simulated with scenarios comprising one or more ramps up and/or one or more ramps down of the one or more scheduling parameters. In certain embodiments, for example, the LPV-ROM may be simulated with scenarios comprising first sinusoidal oscillations of the one or more scheduling parameters and second sinusoidal oscillations of the one or more scheduling parameters. In certain embodiments, for example, the first sinusoidal oscillations may have a higher frequency than the second sinusoidal oscillations. In certain embodiments, for example, the first sinusoidal oscillations may have a higher amplitude than the second sinusoidal oscillations. In certain embodiments, for example, the first sinusoidal oscillations may have a lower amplitude than the second sinusoidal oscillations. In certain embodiments, for example, the first sinusoidal oscillations may occur in time before the second sinusoidal oscillations. In certain embodiments, for example, the second sinusoidal oscillations may occur in time before the first sinusoidal oscillations. In certain embodiments, for example, the first sinusoidal oscillations and/or the second sinusoidal oscillations may comprise 1 cycle, 2 cycles, or 3 cycles. In certain embodiments, for example, the first sinusoidal oscillations and/or the second sinusoidal oscillations may comprise greater than 3 cycles. In certain embodiments, for example, the first sinusoidal oscillations and/or the second sinusoidal oscillations may comprise between 1 and 1000 cycles, for example between 1 and 100 cycles, between 1 and 10 cycles, between 1 and 3 cycles, between 2 and 10 cycles, between 2 and 5 cycles, or the first sinusoidal oscillations and/or the second sinusoidal oscillations may comprise between 2 and 4 cycles. In certain embodiments, for example, the first sinusoidal oscillations and/or the second sinusoidal oscillations may span predetermined ranges (for example dynamic ranges for the physical system) of the one or more scheduling parameters. In certain embodiments, for example, the LPV-ROM may be simulated with scenarios comprising first sinusoidal oscillations of the one or more scheduling parameters (for example one scheduling parameter) having between 2 and 3 cycles, followed by ramps of the one or more scheduling parameters to second sinusoidal oscillations having one or more higher frequencies than the first sinusoidal oscillations, followed by constant values for the one or more scheduling parameters. In certain embodiments, for example, any of the foregoing scenarios comprising the one or more scheduling parameters may further comprise step inputs for the one or more inputs (for example separate step inputs for each of the one or more inputs in different scenarios).

Measuring Prediction Error of the LPV-ROM Representation (406)

A prediction error between the LPV-ROM representation and the training data may be computed using any known method. In certain embodiments, for example, a measure of the prediction error may be a norm of the differences between the LPV-ROM representation and the training data (for example p-norm such as an $L^2$ norm, a $L^\infty$ norm, or a Frobenius norm, if applicable). In certain embodiments, for example, the measure of the prediction error may be a residual in a data-fitting scheme. In certain embodiments, for example, the measure of the prediction error may be one of the foregoing norms that has been further scaled (for example divided by) a norm of the training data (for example a norm of differences between the training data output and average output of the training data). In certain embodiments, for example, the further scaled measure of prediction error may be expressed as a percentage prediction error.

Termination Criteria (408)

In certain embodiments, for example, the termination criteria may comprise a specified error tolerance (for example a predetermined error tolerance and/or a user-specified error tolerance) wherein the termination criteria is reached if the measure of the prediction error is less than the specified error tolerance. In certain embodiments, for example, specified error tolerance may be a percentage error tolerance that corresponds to the percentage prediction error. In certain embodiments, for example, the percentage error tolerance may be less than 20%, for example less than 10%, less than 5%, less than 2%, less than 1%, or the percentage error tolerance may be less than 0.5%. In certain embodiments, for example, the termination criteria may comprise a maximum value for the number of state-space variables N, wherein the termination criteria is reached if the value of N equals the maximum value of N. In certain embodiments, for example, the maximum value of N may be 2. In certain embodiments, for example, the maximum value of N may be 3. In certain embodiments, for example, the maximum value of N may be 4. In certain embodiments, for example, the maximum value of N may be 5. In certain embodiments, for example, the maximum value of N may be 6. In certain embodiments, for example, the maximum value of N may be 7. In certain embodiments, for example, the maximum value of N may be 8. In certain embodiments, for example, the maximum value of N may be 9. In certain embodiments, for example, the maximum value of N may be 10. In certain embodiments, for example, the maximum value of N may be greater than 2, for example greater than 3, greater than 4, greater than 5, greater than 6, greater than 7, greater than 8, greater than 9, greater than 10, greater than 25, greater than 50, greater than 75, greater than 100, greater than 250, greater than 500, greater than 1000, greater than 5000, greater than 10,000, greater than 100,000, or the maximum value of N may be greater than 1,000,000. In certain embodiments, for example, the maximum value of N may be between 3 and 10, for example between 4 and 8, or the maximum value of N may be between 6 and 8.

In certain embodiments, for example, the termination criteria may comprise the specified error tolerance and a maximum value of N. In certain embodiments, for example, the initial value of N may be between 2 and 4 and the termination criteria may comprise a specified error tolerance and a maximum value of N of between 6 and 8. In certain embodiments, for example, the initial value of N may be 2 and the termination criteria may comprise a specified error tolerance and a maximum value of N of between 6 and 7.

Generating LPV-ROM Representation (402)

To simplify generation of LPV-ROM representations, in certain embodiments, for example, the matrices A-D of the LPV-ROM representation may have predetermined structural features (for example the LPV-ROM representation may have a predetermined canonical form). In certain embodiments, for example, the system matrix A may be a diagonal matrix. In certain embodiments, for example, the system matrix A represents the poles of the LPV. In certain embodiments, for example, the input matrix B may be a matrix of constant values that do not depend on the one or more scheduling parameters ρ. In certain embodiments, for example, the output matrix C may be scaled such that the input matrix B may be a column vector of 1's. In certain embodiments, for example, the control matrix C may entirely represent the parameter varying residues of the LPV-ROM. In certain embodiments, for example, the matrices A-D may be structured such that pole dependencies and residue dependencies reside in different matrices (for example pole dependencies may be isolated to the system matrix A and residue dependency may be isolated to the control matrix C). In certain embodiments, for example, the LPV-ROM representation may comprise negative real poles, and may provide a good approximation of a stable physical system such as an electronics package or battery pack with appropriately sized thermal controls. In certain embodiments, for example, the matrices A-D may consist of real-valued functions of the one or more scheduling parameters ρ. In certain embodiments, for example, the LPV-ROM representation may be a Canonical LPV-ROM (CLPV-ROM) representation such as the following:

$$\frac{dx(t)}{dt} = A^c(\rho(t))x(t) + B^c u(t)$$

$$y(t) = C^c(\rho(t))x(t) + D^c(\rho(t))u(t)$$

where: $A^c$ is an N-by-N diagonal matrix of real first functions of negative, real poles and the one or more scheduling parameters ρ, $B^c$ is a matrix of constant coefficients, $C^c$ is a matrix of real-valued second functions of the residues and the one or more scheduling parameters ρ, and $D^c$ is a matrix of real-valued functions of the one or more scheduling parameters ρ.

In certain embodiments, for example, the CLPV-ROM representation may be a block form representation (B-CLPV-ROM) in which several CLPV-ROM representations having different state-space variables are obtained for different inputs and then combined. For example, CLPV-ROM for two inputs ($u_1$ and $u_2$) may be combined in block form as follows (the time dependencies of x, y, u, and ρ are not shown):

$$\frac{d}{dt}\begin{bmatrix} x_1 \\ x_2 \end{bmatrix} = \begin{bmatrix} A_1^c & \emptyset \\ \emptyset & A_2^c \end{bmatrix}\begin{bmatrix} x_1 \\ x_2 \end{bmatrix} + \begin{bmatrix} B_1^c & \emptyset \\ \emptyset & B_2^c \end{bmatrix}\begin{bmatrix} u_1 \\ u_2 \end{bmatrix}$$

$$y = [\emptyset^{C_1^c} C_2^c e^{\emptyset \mathbb{I}_{x_2}^{x_1}}] + [\emptyset^{D_1^c} D_2^c e^{\emptyset \mathbb{I}_{u_2}^{u_1}}]$$

where: $x_1$ is an n-dimensional column vector of state-space variables associated with scalar input $u_1$, $A_1^c$ is an n-by-n system matrix corresponding to the scalar input $u_1$, $B_1^c$ is an n-dimensional column vector of 1's multiplying the scalar input $u_1$, $x_2$ is an m-dimensional column vector (note: n+m=N) of state-space variables associated with scalar input $u_2$, $A_2^c$ is an m-by-m system matrix corresponding to the scalar input $u_2$, and $B_2^c$ is an m-dimensional column vector of 1's multiplying the scalar input $u_2$. As shown, in certain embodiments the number of state-space variables n and m for the two CLPV-ROM representations may differ, and may be optimized for each of the two inputs.

In principle, any of the LPV-ROM, CLPV-ROM, or B-CLPV-ROM representations may be calibrated to data (for example experimental data or simulation data obtained from a computer implemented model of the physical system) comprising samples of the one or more outputs as a function of the one or more inputs and the one or more scheduling parameters.

Moreover, in certain embodiments, for example, models for systems with multiple inputs may be subdivided into separate LPV-ROM representations for each input (or several groups of inputs), and the separate LPV-ROM representations calibrated to training data for each input (or the several groups of inputs). The calibrated LPV-ROM representations may then be combined to form an overall LPV-ROM representation (for example an overall model in the form of a B-CLPV-ROM representation) to provide a reduced order model of the physical system. In certain embodiments, for example, the training data may be input response data for step inputs. In certain embodiments, for example, the training data may comprise one or more of the inputs disclosed herein.

Figure 5:
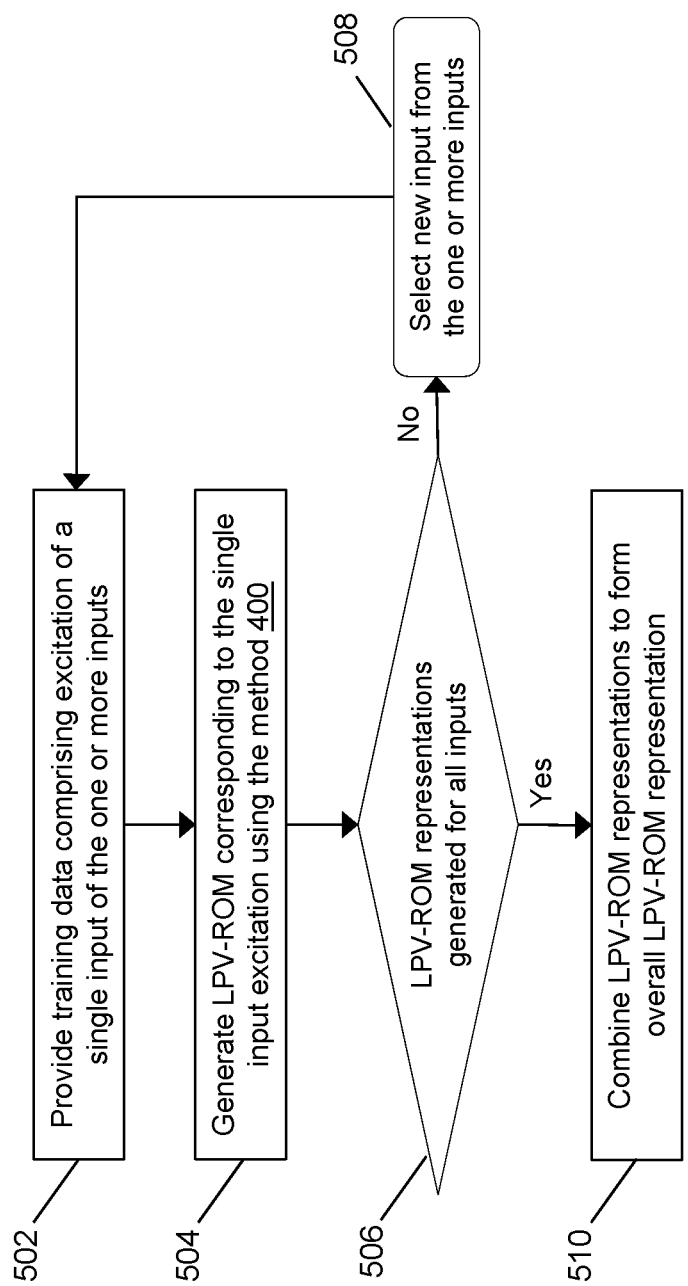
FIG. 5 is flowchart illustration of a method to construct an overall LPV-ROM representation from a sequence of LTI-ROM representations.

FIG. 5 depicts a serial approach to constructing the overall LPV-ROM representation in which training data comprising excitation of single inputs is provided 502 to generate 504 single-input LPV-ROM representations using the method 400 until all inputs have been selected 508, and the single-input LPV-ROM representations combined 510 to form the overall LPV-ROM model.

Figure 6:
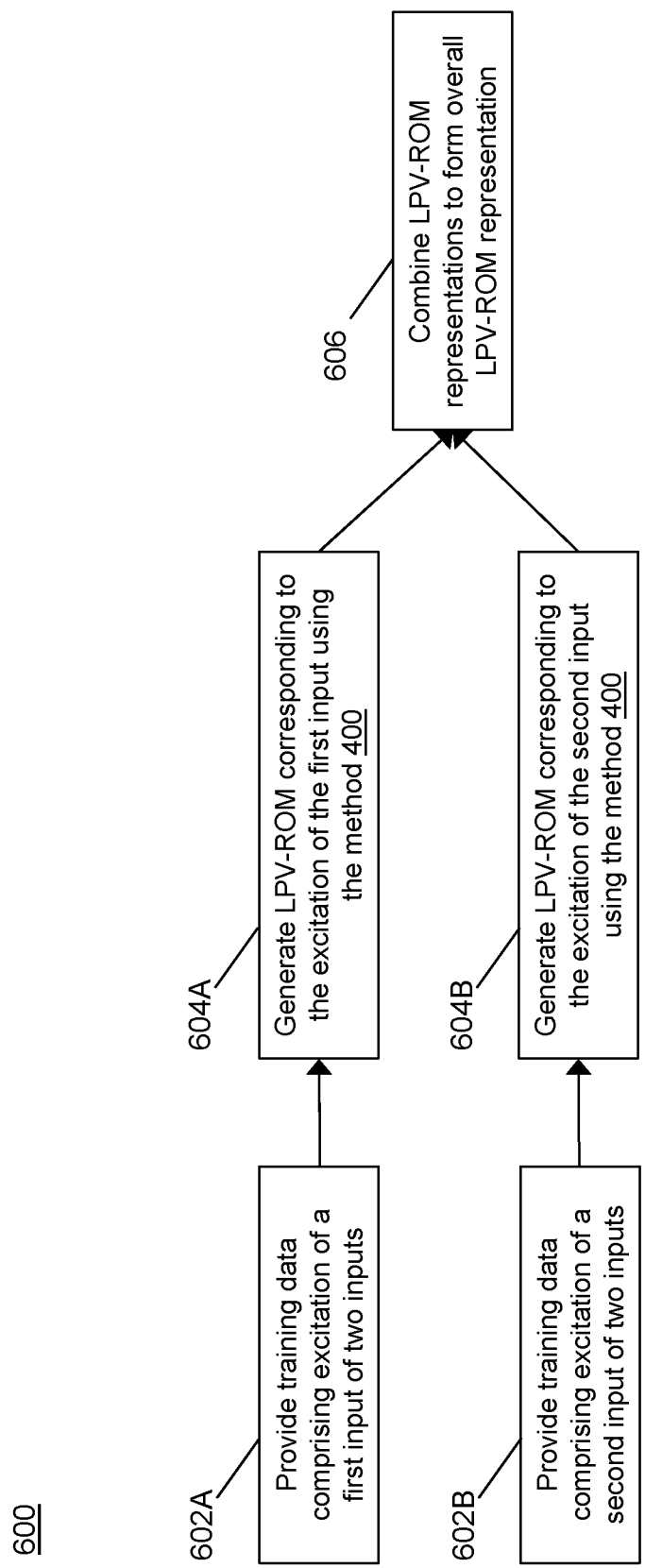
FIG. 6 is flowchart illustration of a method to construct an overall LPV-ROM representation from a parallel series LTI-ROM representations.

In certain embodiments, for example, the computation of multiple-inputs LPV-ROM representations may be parallelized. As shown in FIG. 6 for generation of an overall LPV-ROM with two inputs, the training data may be separately provided 602A-B to separate processes 604A-B for generating single-input LPV-ROM representations using the method 400 in each case, which may be combined 606 to form the overall LPV-ROM representation. In certain embodiments, for example, the separately provided training data may be generated by separate bare metal computing machines, separate virtual machines, separate containers, or a combination of two or more of the foregoing. In certain embodiments, for example, the separate LPV-ROM representations for the two different input excitations may be generated by separate bare metal computing machines, separate virtual machines, separate containers, or a combination of two or more of the foregoing. In certain embodiments for example, generation of the training data for the first input and generation of the LPV-ROM representation corresponding to the first input may be performed on a first computing machine (for example, bare metal device, virtual device, or container); and/or generation of the training data for the second input and generation of the LPV-ROM representation corresponding to the second input may be performed on a second computing machine (for example, bare metal device, virtual device, or container). In certain embodiments, for example, the overall LPV-ROM representation may be generated piecemeal from the LPV-ROM representations for the first and second inputs as needed during runtime simulation of the overall LPV-ROM representation. In certain embodiments, for example, the LPV-ROM representation corresponding to the first input and the LPV-ROM representation of the second input may be stored in different locations (for example different computing machines or different directories of a single machine) and periodically accessed to generate and/or update the overall LPV-ROM representation.

Construction of LPV-ROM Matrices by Interpolation

In certain embodiments, for example, the matrices A-D (in any of the foregoing forms or forms disclosed herein, inclusive of the matrices in a canonical form and/or forms for individual input that may be combined into block form) may be approximated by weighted combinations of the matrices evaluated at specific values of the one or more scheduling parameters ρ. Without any loss of generality, the approximation may comprise, for example:

$$A(\rho(t)) = \sum_{i=1}^{I} w_i(\rho(t))A(\rho_i)$$

$$B(\rho(t)) = \sum_{i=1}^{I} w_i(\rho(t))B(\rho_i)$$

$$C(\rho(t)) = \sum_{i=1}^{I} w_i(\rho(t))C(\rho_i)$$

$$D(\rho(t)) = \sum_{i=1}^{I} w_i(\rho(t))D(\rho_i)$$

$$\sum_{i=1}^{I} w_i(\rho(t)) = 1, w_i \geq 0$$

where $A(\rho_i)$, $B(\rho_i)$, $C(\rho_i)$, and $D(\rho_i)$ (denoted below as $A_i$, $B_i$, $C_i$, and $D_i$, respectively) are the matrices A-D evaluated at specific fixed values of the scheduling parameter $\rho_i$ that may be selected to span the dynamic range of the scheduling parameter ρ.

In certain embodiments, for example, the weighing functions $w_i$ (along with additional terms if needed) may be selected to interpolate between the matrices $A_i$-$D_i$ matrices. In certain embodiments, for example, the interpolation may be piecewise constant interpolation. In certain embodiments, for example, the interpolation may be linear interpolation. In certain embodiments, for example, the interpolation may be polynomial interpolation. In certain embodiments, for example, the interpolation may be spline interpolation (for example cubic spline interpolation). In certain embodiments, for example, the interpolation may be smoothing spline interpolation. For example, if linear combinations of neighboring $A_i$-$D_i$ matrices are used, then the matrices A-D used in simulation of the LPV-ROM consist of piecewise linear functions of the one or more scheduling parameters. In the case of a single scheduling parameter, for example, the following weighting functions may be selected:

$$w_i(\rho(t)) = \begin{cases} \dfrac{\rho - \rho_i}{\rho_{i+1} - \rho_i} & \rho_i \text{ nearest left neighbor to } \rho \\ \dfrac{\rho_{i+1} - \rho}{\rho_{i+1} - \rho_i} & \rho_i \text{ nearest right neighbor to } \rho \\ 0 & \text{otherwise} \end{cases}$$

The matrices $A_i$-$D_i$, which comprise constant coefficient values (i.e., do not depend on time), may be much easier to determine than the variable matrices A-D, and may be obtained by solving the following Linear Time Invariant-Reduced Order Model (LTI-ROM) at each value $\rho_i$, i=1, . . . , I of the one or more scheduling parameters:

$$\frac{dx(t)}{dt} = A_i x(t) + B_i u(t)$$

$$y(t) = C_i x(t) + D_i u(t)$$

Figure 7:
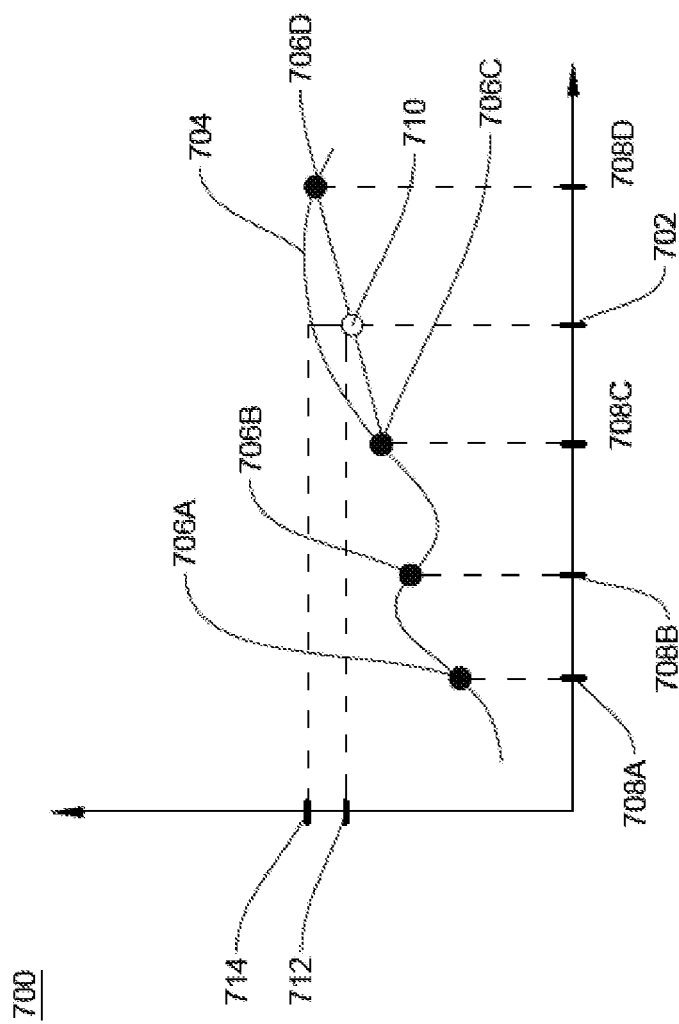
FIG. 7 is a schematic depiction of an interpolation method.

In certain embodiments, for example, the LPV-ROM representation may be constructed as a weighted combination (for example an interpolation) of separately-fitted LTI-ROM representations characterized by the $A_i$-$D_i$ matrices. In this method, data for the one or more outputs in response to excitations of the one or more inputs at specific fixed values of the one or more scheduling parameters are obtained and separately fitted to the LTI-ROM models. At simulation time, a combination of the LTI-ROM models is dynamically selected based on the values of the dynamically varying one or more scheduling parameters at a given point in time of the simulation. An exemplary depiction of the dynamic simulation methodology 700 is illustrated in FIG. 7 to show, for a particular value 702 of a scheduling parameter generated during simulation of an LPV-ROM, the estimation of a coefficient value (with the actual coefficient values represented by a curve 704) in any one of A-D matrices. As shown, coefficient values 706A-D are computed at fixed values 708A-D of the scheduling parameter, the left and right neighbors (708C and 708D, respectively) of the particular value 702 ascertained, and linear interpolation of the corresponding coefficient values (706C and 706D, respectively) performed to obtain an interpolated point 710 having a coefficient value 712. The interpolated coefficient value 712 approximates the actual coefficient value 714, and the error between the interpolated coefficient value 712 and the actual coefficient value 714 may be reduced by increasing the number of fixed values of the scheduling parameters used in the interpolation.

Figure 8:
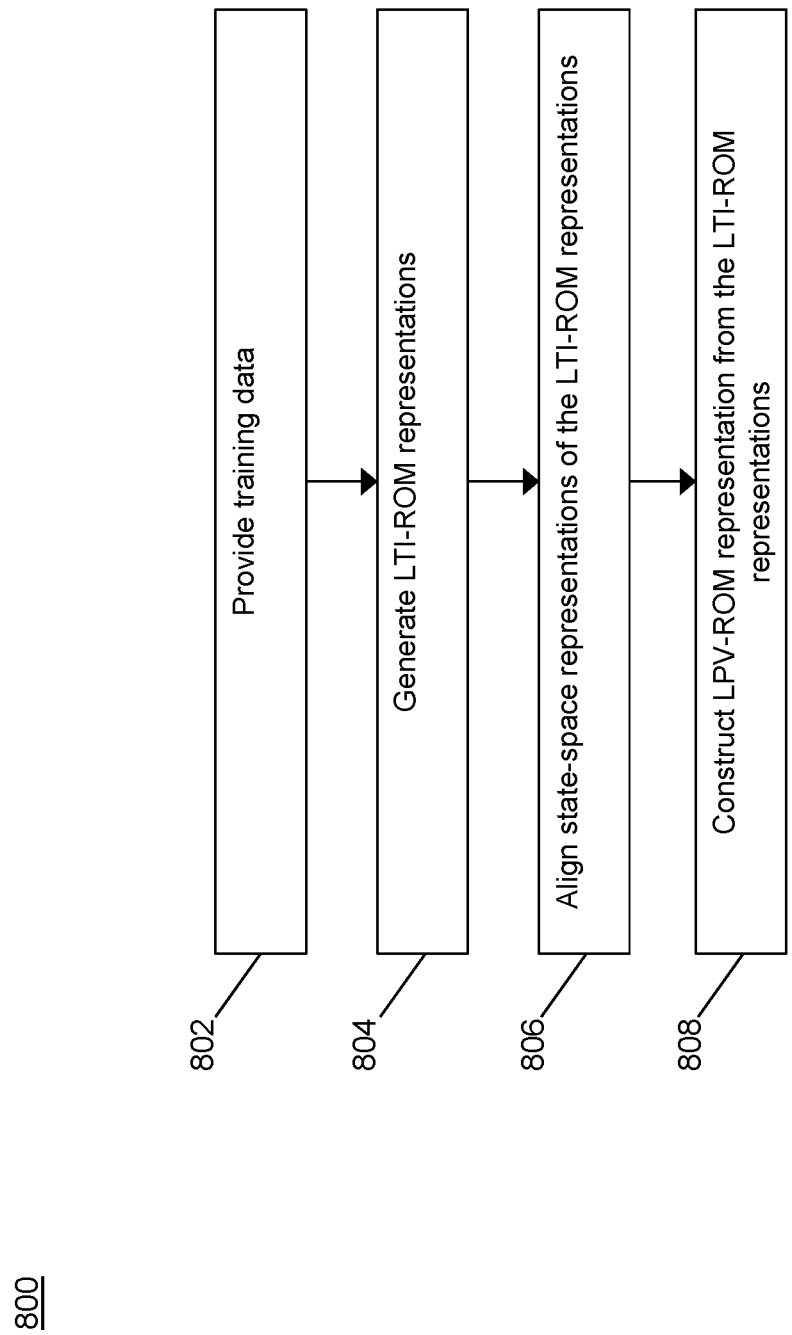
FIG. 8 is flowchart illustration of a method to construct an LPV-ROM representation from a series of LTI-ROM representations.

Prior art uses of LTI-ROM representations to construct an LPV-ROM representation compute the LTI-ROM representations independently of one another at different fixed values of the one or more scheduling parameters. As a result, state-space variables may be inconsistently sorted (for example appear in a different order) between the LTI-ROM representations, or may even describe different state-space representations of the physical system. If so, weighted combinations of the matrices $A_i$-$D_i$ may produce nonsensical results or even generate unstable or singular matrices A-D. In certain embodiments, for example, additional processing of the matrices $A_i$-$D_i$ may be performed to align the state-space representations in the LTI-ROM representations so that weighted combinations of the matrices $A_i$-$D_i$ provide intended results. A flowchart depiction of a method 800 to construct an LPV-ROM representation from a series of LTI-ROM representations that includes such additional processing is shown in FIG. 8. In certain embodiments, for example, the method 800 may be incorporated into the generation of an LPV-ROM representation with N state-space variables 402 as part of the method 400 to select a number of state-space variables N based on prediction error of the LPV-ROM representation. In certain embodiments, for example, the method 800 may be incorporated in the method 500 for obtaining a combined LPV-ROM representation based on single-input excitations by incorporation in the method 400.

Training data is provided 802 to generate 804 LTI-ROM representations at a plurality of fixed values of the scheduling parameter as described herein to produce, inter alia, the matrices $A_i$-$D_i$. Prior to constructing 808 the LPV-ROM representation, adjustments to the matrices $A_i$-$D_i$ are performed to effectively align 806 state-space representations between the LTI-ROM representations.

In certain embodiments, for example, the training data may be provided 802 by a computer-implemented model configured to simulate outputs of the physical system in response to the one or more inputs one or more scheduling parameters. In certain embodiments, for example, the data may comprise time-domain training data. In certain embodiments, for example, the data may be frequency domain training data. In certain embodiments, for example, the computer-implemented model may be simulated at a plurality of fixed values of the scheduling parameter to obtain output responses to excitations of the one or more inputs (for example one or more step inputs, such as one step input) at the fixed values of the scheduling parameter.

In certain embodiments, for example, generating 804 the LTI-ROM representations may comprise fitting the LTI-ROM representations to the output responses. In certain embodiments, for example, the fitting may comprise one or more of the methods disclosed herein. In certain embodiments, for example, the fitting may comprise time-domain vector fitting (see, for example, Grivet-Talocia S, "The Time-Domain Vector Fitting Algorithm for Linear Macromodeling," AEÜ Int. J. Elec. Commc'n. 58:1 (2004) 293-295). In certain embodiments, for example, the fitting may comprise time-domain vector fitting (see id.). In certain embodiments, the fitting may comprise a frequency domain Sample Matrix Inversion (SMI) algorithm (see, for example, Lovera, M. et al., "Identification for gain-scheduling: A balanced subspace approach," Proc. of the 2007 Am. Control Conf. (July 2007) 858-863). In certain embodiments, for example, the fitting may be constrained to provide LTI-ROM representations with real, negative poles. In certain embodiments, for example, one or more preliminary fittings may be performed to obtain complex poles, and real portions of the complex poles used as initial guesses to perform the fitting while searching for real stable poles.

Figure 9:
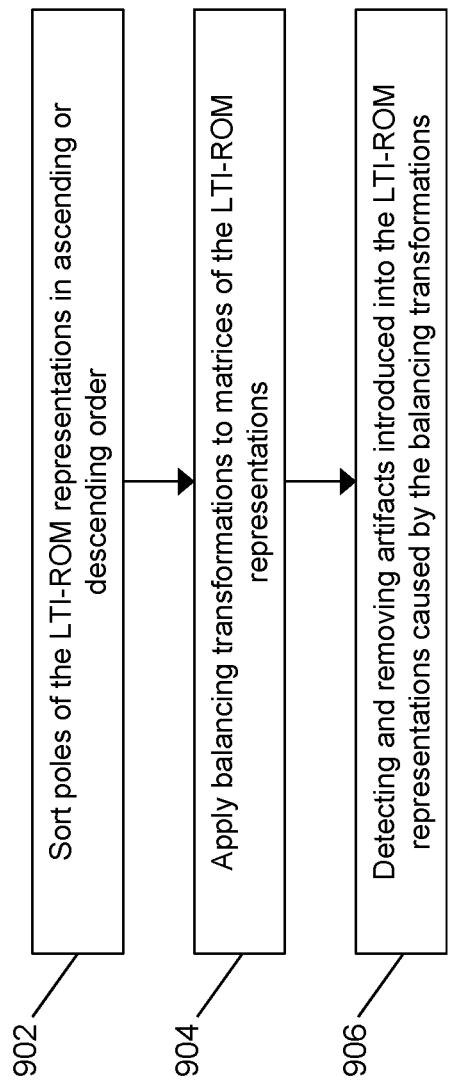
FIG. 9 is a flowchart illustration of a method to align LTI-ROM matrices.

FIG. 9 provides a flowchart for a method to align the state-space representations between the LTI-ROM representations. Poles of the LTI-ROM representations are sorted 902 in ascending or descending order in each LTI-ROM representation in order to crudely assign state-space variables based on the physics they represent in a consistent fashion across the different LTI-ROM representations. In certain embodiments, for example, the sorting 902 may comprise rearranging one or more groups of the matrices $A_i$-$D_i$ so that the poles appear in ascending or descending arrangements in the coefficient matrices. In certain embodiments, for example, the LTI-ROM representations may be CLTI-ROM representations wherein pole dependency is confined to the system matrices A. Once the correct order of poles are determined, the columns of the remaining matrices are rearranged so that the state-space variables are organized consistently for performing matrix computations.

Following the pole sorting 902, balancing transformations are applied 904 to the matrices $A_i$-$D_i$ to consistently orient the coordinate axes of the state-space representations between the different LTI-ROM representations. In certain embodiments, for example, the balancing transformations may be selected to balance observability and controllability Gramians of the LTI-ROM representations. (see, for example, Lovera, M. et al., "Identification for gain-scheduling: A balanced subspace approach," *Proc. of the* 2007 *Am. Control Conf.* (July 2007) 858-863). For example, given an observability Gramian $W_o^i$ and the controllability Gramian $W_c^i$ of LTI-ROM matrices $A_i$-$D_i$ for one of the i∈ 1, . . . , I:

$$W_c^i = \sum_{k=0}^{\infty} (A_i^k)^T C_i^T C_i A_i^k$$

$$W_o^i = \sum_{k=0}^{\infty} A_i^k B_i B_i^T (A_i^k)^T,$$

or approximations of one or both of the foregoing Gramians, a transformation $T_i$ may be generated and applied to the LTI-ROM matrices $A_i$-$D_i$ to obtain adjusted LTI-ROM matrices $A_i$-$D_i$ to the such at $\hat{W}_o^i = \hat{W}_c^i$ for the adjust LTI-ROM matrices, where the adjusted Gramians are a diagonal matrix of the singular values of the product of the Gramians $\hat{W}_o^i \hat{W}_c^i$. Such a transformation is sometimes said to "internally balance" the state-space of the LTI-ROM representation. In certain embodiments, for example, the transformations $T_i$ for i=1, . . . , I may be generated and applied to their respective LTI-ROM matrices to obtain adjusted LTI-ROM matrices $\hat{A}_i$-$\hat{D}_i$ for i=1, . . . , I which reorient potentially disparate state-space representations between the different LTI-ROM representations along more consistent sets of coordinate axes. In certain embodiments, for example, the transformations may be obtained by computing Cholesky factorizations of $W_o^i$ and $W_c^i$ ($L_o^i$ and $L_c^i$, respectively), computing the singular value decomposition $L_o^{iT} L_c^i = U_i \Sigma_i V_i^T$, and computing the transformations as $T_i = L_c^i V_i \Sigma_i^{-1/2}$ with inverses $T_i^{-1} = \Sigma_i^{-1/2} U_i^T L_o^{iT}$ for i=1, . . . , I. The adjusted LTI-ROM matrices may then be computed as follows:

$$\hat{A}_i = T_i^{-1} A_i T_i$$

$$\hat{B}_i = T_i^{-1} B_i$$

$$\hat{C}_i = C_i T_i$$

$$\hat{D}_i = D_i$$

Such balancing transformations can introduce computational artifacts that may appear in some but not all of the LTI-ROM representations, the method 900 includes detection and removal 906 of these artifacts. In certain embodiments, for example, detection and removal 906 may comprise detecting and removing sign changes in the LTI-ROM representations caused by the application 904 of the balancing transformations.

Direct Generation of LPV-ROM Representation

Figure 10:
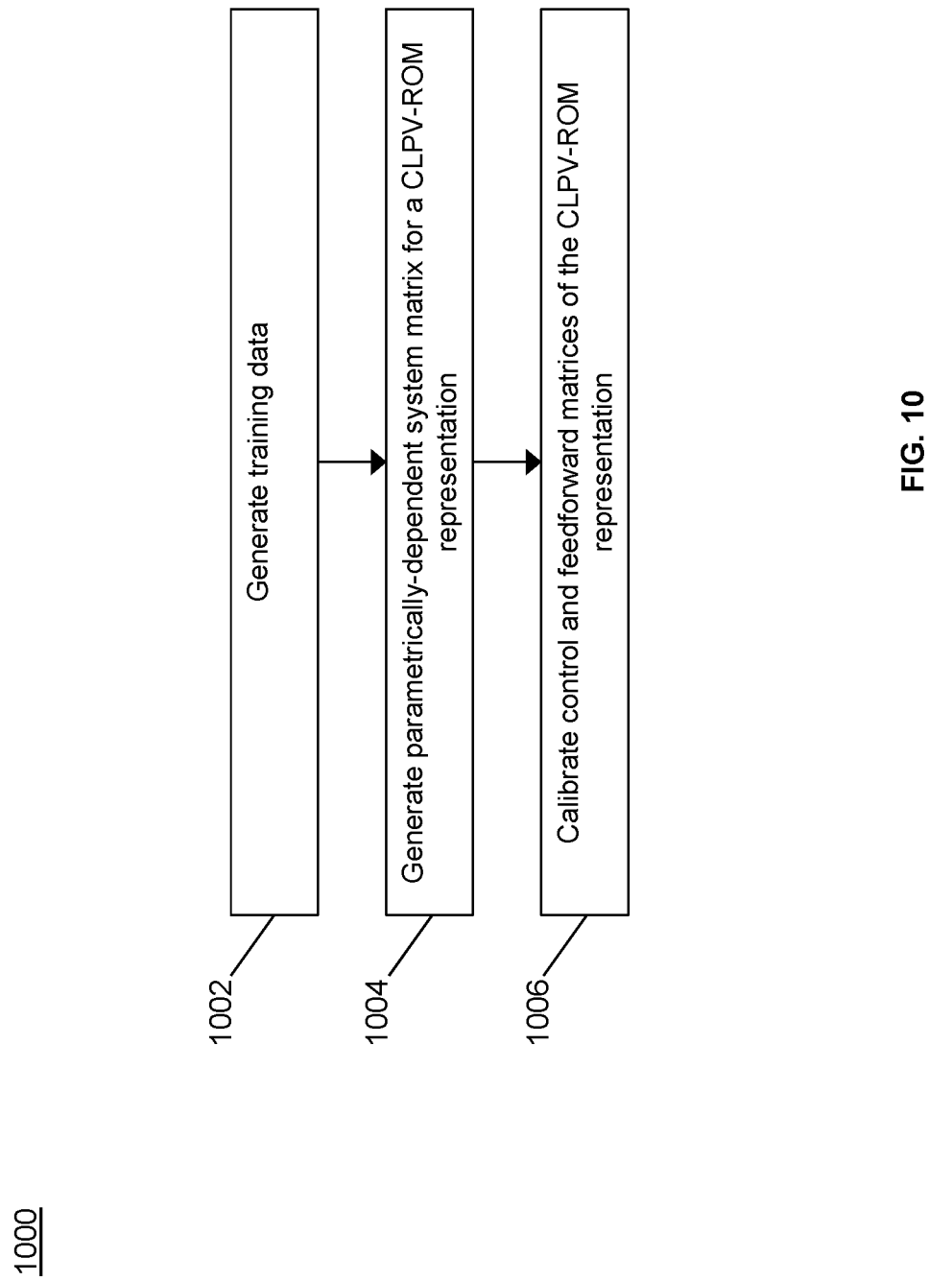
FIG. 10 is a flowchart illustration of a direct method to construct an LPV-ROM representation from training data.

Certain embodiments may provide, for example, a method of generating the LPV-ROM representation (for example as a CLPV-ROM representation) directly from training data without the necessity of generating intermediate LTI-ROM representations. FIG. 10 is a flowchart illustration of a method 1000 that can exploit a canonical formulation to generate the LPV-ROM representation directly from training data, comprising: generation of suitable training data 1002, determination 1004 of a canonical system matrix A(ρ) that actively depends on the one or more scheduling parameters ρ followed by separate calibration 1006 of a canonical control matrix C(ρ) and feedforward matrix D (ρ), both of which actively depend on the one or more scheduling parameters ρ. In certain embodiments, for example, the method 1000 may be incorporated into the generation of an LPV-ROM representation with N state-space variables 402 as part of the method 400 to select a number of state-space variables N based on prediction error of the LPV-ROM representation. In certain embodiments, for example, the method 1000 may be incorporated in the method 500 for obtaining a combined LPV-ROM representation (for example a B-CLPV-ROM representation) based on single-input excitations by incorporation in the method 400.

In certain embodiments, for example, the system matrix A(ρ) may be a diagonal matrix representing the parameter varying poles of the CLPV-ROM. In certain embodiments, for example, the input matrix B(ρ) may be a matrix of constants (for example a column matrix of 1's). In certain embodiments, for example, the control matrix C(ρ) may depend on residues of the CLPV-ROM representation.

Training data for the method 1000 may be generated 1002 by any available method for simulating the physical system or obtaining experimental measurements from the physical system. In certain embodiments, for example, the training data may be generated from scenarios comprising time-dependent scenarios (for example excitations) for the one or more inputs and fixed values for the one or more scheduling parameters. In certain embodiments, for example, the training data may be generated from scenarios comprising time-dependent scenarios (for example excitations) of the one or more inputs with fixed values for the one or more scheduling parameters. In certain embodiments, for example, the training data may be generated from scenarios comprising time-dependent scenarios for both the one or more inputs and the one or more scheduling parameters. In certain embodiments, for example, the training data may be generated from scenarios comprising time-dependent scenarios for the one or more inputs that together span a dynamic range of the one or more inputs for the physical system. In certain embodiments, for example, the training data may be generated from scenarios comprising time-dependent scenarios for the one or more scheduling parameters that span a dynamic range of the one or more scheduling parameters for the physical system. In certain embodiments, for example, the training data may be generated from scenarios in which at least one (for example all) of the inputs are separately excited (for example other inputs, if any, are not excited) in at least a first one of the scenarios. In certain embodiments, for example, the separate excitations may comprise step response excitations or any of the excitations disclosed herein. In certain embodiments, for example, the training data may be generated from scenarios with multiple inputs in which at least two of the multiple inputs are excited in at least a first one of the scenarios. In certain embodiments, for example, the training data may be generated from scenarios comprising sinusoidal oscillations of the one or more scheduling parameters. In certain embodiments, for example, the training data may be generated from scenarios comprising one or more ramps up and/or one or more ramps down of the one or more scheduling parameters. In certain embodiments, for example, the training data may be generated from scenarios comprising first sinusoidal oscillations of the one or more scheduling parameters and second sinusoidal oscillations of the one or more scheduling parameters. In certain embodiments, for example, the first sinusoidal oscillations may have a higher frequency than the second sinusoidal oscillations. In certain embodiments, for example, the first sinusoidal oscillations may have a higher amplitude than the second sinusoidal oscillations. In certain embodiments, for example, the first sinusoidal oscillations may have a lower amplitude than the second sinusoidal oscillations. In certain embodiments, for example, the first sinusoidal oscillations may occur in time before the second sinusoidal oscillations. In certain embodiments, for example, the second sinusoidal oscillations may occur in time before the first sinusoidal oscillations. In certain embodiments, for example, the first sinusoidal oscillations and/or the second sinusoidal oscillations may comprise 1 cycle, 2 cycles, or 3 cycles. In certain embodiments, for example, the first sinusoidal oscillations and/or the second sinusoidal oscillations may comprise greater than 3 cycles. In certain embodiments, for example, the first sinusoidal oscillations and/or the second sinusoidal oscillations may comprise between 1 and 1000 cycles, for example between 1 and 100 cycles, between 1 and 10 cycles, between 1 and 3 cycles, between 2 and 10 cycles, between 2 and 5 cycles, or the first sinusoidal oscillations and/or the second sinusoidal oscillations may comprise between 2 and 4 cycles. In certain embodiments, for example, the first sinusoidal oscillations and/or the second sinusoidal oscillations may span predetermined ranges (for example dynamic ranges for the physical system) of the one or more scheduling parameters. In certain embodiments, for example, the training data may be generated from scenarios comprising first sinusoidal oscillations of the one or more scheduling parameters (for example one scheduling parameter) having between 2 and 3 cycles, followed by ramps of the one or more scheduling parameters to second sinusoidal oscillations having one or more higher frequencies than the first sinusoidal oscillations, followed by constant values for the one or more scheduling parameters. In certain embodiments, for example, any of the foregoing scenarios comprising the one or more scheduling parameters may further comprise step inputs for the one or more inputs (for example separate step inputs for each of the one or more inputs in different scenarios).

Figure 11:
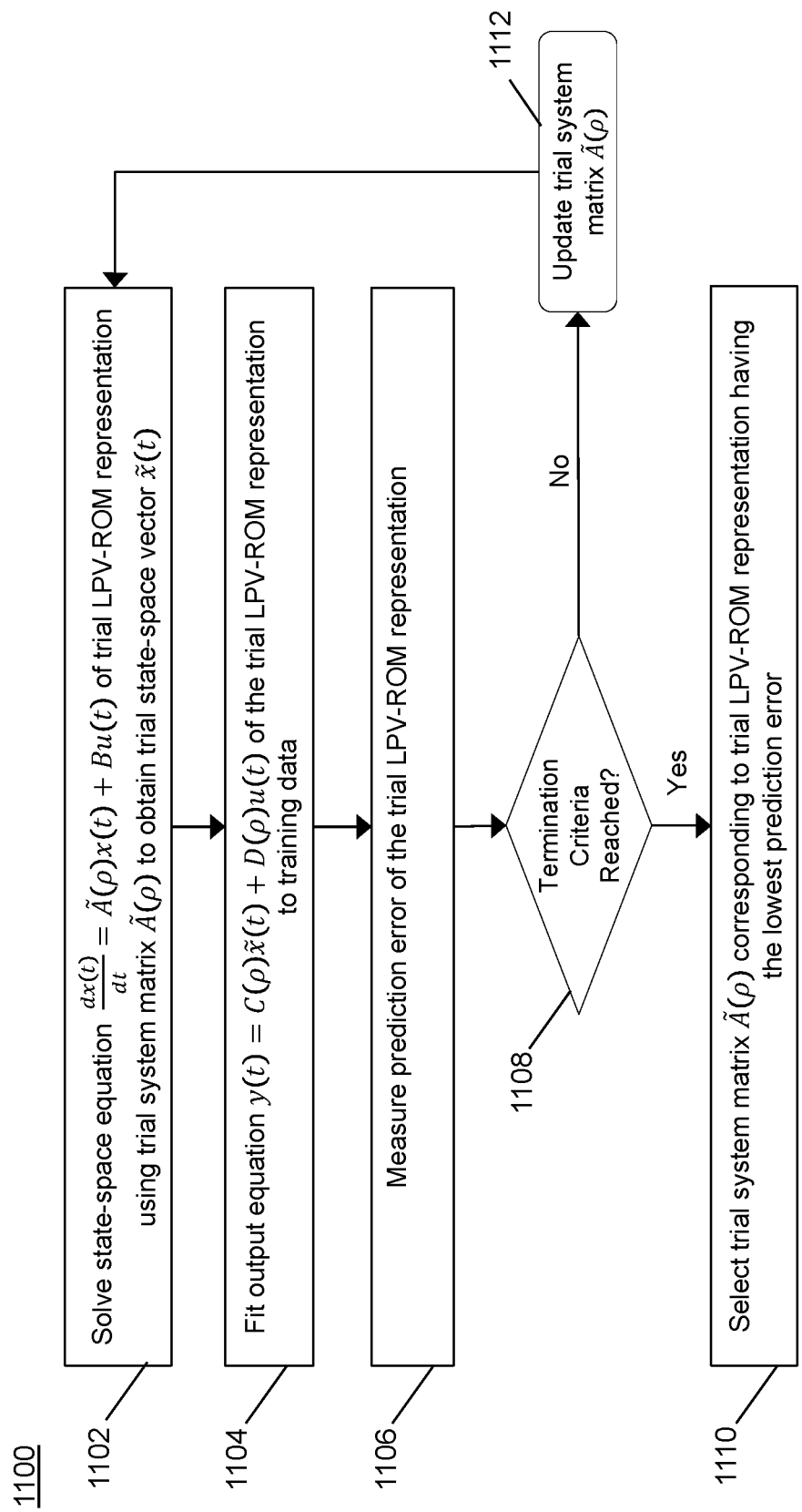
FIG. 11 is a flowchart illustration of a method to obtain a system matrix for an LPV-ROM representation.

In certain embodiments, for example, generation 1004 of the system matrix $A(\rho)$ may comprise optimizing coefficients in the system matrix $A(\rho)$. In certain embodiments, for example, the optimizing may comprise iteratively solving trial LPV-ROM representations with different choices of coefficients until a first global measure of prediction error between the LPV-ROM and a first portion of the training data is reduced below a predetermined threshold. FIG. 11 is a flowchart illustration of an exemplary method 1100 to iteratively solve the trial LPV-ROM representations until the predetermined threshold or other termination criteria is met, comprising solving 1102 a state-space equation of a trial LPV-ROM representation using a trial system matrix $\tilde{A}(\rho)$ to obtain a trial state-space vector $\tilde{x}(t)$, fitting 1104 an output equation (i.e., determining the control matrix $C(\rho)$ and the feedforward matrix $D(\rho)$ of a trial LPV-ROM representation, for example by least squares regression) to the first portion of the training data and the trial state-space vector $\tilde{x}(t)$, measuring 1106 a first global measure of prediction error (for example any of the measures of prediction error disclosed herein) between the trial LPV-ROM representation and the first portion of the training data, and evaluating 1108 whether the prediction error satisfies termination criteria of the method 1100. If the termination criteria is satisfied (for example if the global measure of prediction error is smaller than a predetermined tolerance or if the method has exceeded a predetermined maximum number of iterations), then the system matrix $A(\rho)$ may be selected 1110 as the trial system matrix $\tilde{A}(\rho)$ providing the best trial LPV-ROM representation. If the termination criteria is not satisfied, then the trial system matrix $\tilde{A}(\rho)$ may be updated 1112 and the method 1100 may be continued to reduce the first global measure of prediction error. In certain embodiments, for example, the control matrix $C(\rho)$ and the feedforward matrix $D(\rho)$ may be discarded between updates of the trial system matrix $\tilde{A}(\rho)$. In certain embodiments, for example, a downhill simplex method such as the Nelder-Mead algorithm may be employed to update the trial system matrix $\tilde{A}(\rho)$. In certain embodiments, for example, a gradient-based method may be employed to update the trial system matrix $\tilde{A}(\rho)$.

Other methods of determining the system matrix $A(\rho)$ are contemplated. In certain embodiments, for example, the global measure of error of the LPV-ROM representation may be directly minimized using nonlinear optimization algorithms. In certain embodiments, for example, the global measure of error of the LPV-ROM representation may be directly minimized using constrained or unconstrained nonlinear optimization (for example a line search optimization, a method of feasible directions such as the method of Zoutendijk, a gradient projection method such as the gradient projection method of Rosen, a reduced gradient method such as the reduced gradient method of Wolfe, a convex-simplex method such as the convex-simplex method of Zangwill, a quadratic programming method such as sequential quadratic programming, a linear fractional programming method, or a successive linear programming method). In certain embodiments, for example, the minimized global measure of error may be a local minimum. In certain embodiments, for example, the minimized global measure of error may be a local minimum. In certain embodiments, for example, the global measure of error of the LPV-ROM representation may be directly minimized using a global optimization method.

In certain embodiments, for example, the trial system matrices $\tilde{A}(\rho)$ and the system matrix $A(\rho)$ may comprise a diagonal matrix of negative real first functions of the one or more scheduling parameters $\rho$. In certain embodiments, for example, the real first functions may comprise polynomial functions (for example polynomial functions of order 1, 2, or 3) of the one or more scheduling parameters $\rho$. For example, the system matrix $A(\rho)$ for an LPV-ROM representation with two state-space variables may be parameterized by second order polynomials as follows:

$$A(\rho) = \begin{bmatrix} a_{11}(\rho) & 0 \\ 0 & a_{22}(\rho) \end{bmatrix}$$

with $a_{ii}(\rho) = \alpha_{ii} + \beta_{ii}\rho + \gamma_{ii}\rho^2$

In certain embodiments, for example, the real first and second functions may comprise piecewise-linear functions. In certain embodiments, for example, the control matrix $C(\rho)$ may comprise real second functions of the one or more scheduling parameters $\rho$. In certain embodiments, for example, the real second functions may comprise polynomial functions (for example polynomial functions of order 1, 2, or 3). In certain embodiments, for example, the real second functions may comprise piecewise-linear functions. In certain embodiments, for example, the real second functions may comprise piecewise-linear functions. In certain embodiments, for example, the feedforward matrix $D(\rho)$ may comprise real third functions of the one or more scheduling parameters $\rho$. In certain embodiments, for example, the real third functions may comprise polynomial functions (for example polynomial functions of order 1, 2, or 3). In certain embodiments, for example, the real third functions may comprise exponential functions. In certain embodiments, for example, the real third functions may comprise piecewise-linear functions. In certain embodiments, for example, the system matrix $A(\rho)$ may be a positive definite matrix over a dynamic range of variation of the one or more scheduling parameters $\rho$. In certain embodiments, a positive polynomial interpolation is constructed that ensures the stability of the LPV system.

In certain embodiments, for example, the first portion of the training data may comprise output responses to one or more input excitations (for example one or more step inputs, such as one step input) and dynamic variations in the one or more scheduling parameters over predetermined ranges of the one or more scheduling parameters. In certain embodiments, for example, the first portion of the training data may be generated from scenarios comprising time-dependent scenarios for both the one or more inputs and the one or more scheduling parameters. In certain embodiments, for example, the first portion of the training data may be generated from scenarios comprising time-dependent scenarios for the one or more inputs that together span a dynamic range of the one or more inputs for the physical system. In certain embodiments, for example, the first portion of the training data may be generated from scenarios comprising time-dependent scenarios for the one or more scheduling parameters that span a dynamic range of the one or more scheduling parameters for the physical system. In certain embodiments, for example, the first portion of the training data may be generated from scenarios in which at least one (for example all) of the inputs are separately excited (for example other inputs, if any, are not excited) in at least a first one of the scenarios. In certain embodiments, for example, the separate excitations may comprise step response excitations or any of the excitations disclosed herein. In certain embodiments, for example, the first portion of the training data may be generated from scenarios with multiple inputs in which at least two of the multiple inputs are excited in at least a first one of the scenarios. In certain embodiments, for example, the first portion of the training data may be generated from scenarios comprising sinusoidal oscillations of the one or more scheduling parameters. In certain embodiments, for example, the first portion of the training data may be generated from scenarios comprising one or more ramps up and/or one or more ramps down of the one or more scheduling parameters. In certain embodiments, for example, the first portion of the training data may be generated from scenarios comprising first sinusoidal oscillations of the one or more scheduling parameters and second sinusoidal oscillations of the one or more scheduling parameters. In certain embodiments, for example, the first sinusoidal oscillations may have a higher frequency than the second sinusoidal oscillations. In certain embodiments, for example, the first sinusoidal oscillations may have a higher amplitude than the second sinusoidal oscillations. In certain embodiments, for example, the first sinusoidal oscillations may have a lower amplitude than the second sinusoidal oscillations. In certain embodiments, for example, the first sinusoidal oscillations may occur in time before the second sinusoidal oscillations. In certain embodiments, for example, the second sinusoidal oscillations may occur in time before the first sinusoidal oscillations. In certain embodiments, for example, the first sinusoidal oscillations and/or the second sinusoidal oscillations may comprise 1 cycle, 2 cycles, or 3 cycles. In certain embodiments, for example, the first sinusoidal oscillations and/or the second sinusoidal oscillations may comprise greater than 3 cycles. In certain embodiments, for example, the first sinusoidal oscillations and/or the second sinusoidal oscillations may comprise between 1 and 1000 cycles, for example between 1 and 100 cycles, between 1 and 10 cycles, between 1 and 3 cycles, between 2 and 10 cycles, between 2 and 5 cycles, or the first sinusoidal oscillations and/or the second sinusoidal oscillations may comprise between 2 and 4 cycles. In certain embodiments, for example, the first sinusoidal oscillations and/or the second sinusoidal oscillations may span predetermined ranges (for example dynamic ranges for the physical system) of the one or more scheduling parameters. In certain embodiments, for example, the first portion of the training data may be generated from scenarios comprising first sinusoidal oscillations of the one or more scheduling parameters (for example one scheduling parameter) having between 2 and 3 cycles, followed by ramps of the one or more scheduling parameters to second sinusoidal oscillations having one or more higher frequencies than the first sinusoidal oscillations, followed by constant values for the one or more scheduling parameters. In certain embodiments, for example, any of the foregoing scenarios comprising the one or more scheduling parameters may further comprise step inputs for the one or more inputs (for example separate step inputs for each of the one or more inputs in different scenarios).

Following determination 1004 of the canonical system matrix $A(\rho)$, control $C(\rho)$ and feedforward $D(\rho)$ matrices which also actively depend on the one or more scheduling parameters $\rho$ are calibrated 1006 to the first portion of the training data, subject to constraints based on a second portion of the training data.

In certain embodiments, for example, the calibrating may comprise minimizing a second global measure of prediction error between the LPV-ROM and the first portion of the training data, given the optimized system matrix $A(\rho)$, subject to constraints on local measures of prediction errors between the LPV-ROM and the second portion of the training data.

In certain embodiments, for example, the second portion of the training data may be generated from scenarios comprising time-dependent scenarios (for example excitations) for the one or more inputs and fixed values for the one or more scheduling parameters (for example the second portion of the training data may be the same training data used to generate LTI-ROM representations). In certain embodiments, for example, the second portion of the training data may be generated from scenarios comprising time-dependent scenarios (for example excitations) of the one or more inputs with fixed values for the one or more scheduling parameters. In certain embodiments, for example, the local measure of the prediction errors may comprise a norm (for example any of the norms disclosed herein) of the errors between the LPV-ROM representation (compared to the second portion of the training data) at the fixed values of the one or more scheduling parameters. In certain embodiments, for example, the minimizing may comprise a convex programming problem. In certain embodiments, for example, the minimizing may be performed using any of the optimization algorithms disclosed herein (for example a gradient-based programming method).

Mathematical Setup of LPV-ROM Representation

A polynomial LPV interpolation of a LPV-ROM representation may be done in a variety of ways. In certain embodiments, for example, scheduling parameter $\rho(t)$ may be a mass flow rate or air velocity. In certain embodiments, the scheduling parameter $\rho(t)$ may be fixed at a specific period of time. In certain embodiments, the system matrix $A(\rho(t))$ may be provided in a polynomial representation as has been described in previous sections of the document. In certain embodiments, for example, the system matrix $A(\rho(t))$ may be represented as a polynomial that sums up matrices of the same size multiplied by the scheduling parameter ρ(t) at different orders. In certain embodiments, ρ(t) is positive and hence a positive polynomial interpolation is established. In certain embodiments, the system matrix A(ρ(t)) has negative real diagonal elements. In certain embodiments, the system matrix A(ρ(t)) may be a diagonal matrix with negative real poles. In certain embodiments, the system matrix A(ρ(t)) may be represented by a quadratic polynomial like the following:

$$A(\rho(t)) = [\alpha_{ij}] + [\beta_{ij}]\rho(t) + [\gamma_{ij}]\rho^2(t) = \sum_{k=0}^{2} A_k \rho^k(t)$$

With this method of interpolation, a mathematical setup may be done in a variety of ways. In certain embodiments, the mathematical setup provides both local and global training data. In certain embodiments, the global training data allows the system to excite both the scheduling parameter ρ(t) and the inputs of the system at the same time and provide a response of the dynamical system. In certain embodiments, for example, the mathematical setup provides solutions for a non-linear optimization problem, resulting in negative real parameter-varying poles of the system. In certain embodiments, the mathematical setup for the LPV-ROM representation is the following:

$$A(\rho(t)) = \sum_{k=0}^{K-1} A_k \rho^k(t)$$

$$C(\rho(t)) = \sum_{k=0}^{K-1} C_k \rho^k(t)$$

$$D(\rho(t)) = \sum_{k=0}^{K-1} D_k \rho^k(t)$$

$A_k, C_k, D_k \forall k \in \{0, \ldots, K-1\}$ where K is the order of polynomial. In certain embodiments, B(ρ(t)) is independent of the scheduling parameter ρ(t). In certain embodiments, B(ρ(t)) is in canonical form. In certain embodiments, B(ρ(t)) is fixed and known.

In certain embodiments, the mathematical setup provides that $A_k$ is a diagonal matrix with real negative diagonal elements and the scheduling parameter ρ(t) to be positive. As a result, the mathematical setup of the LPV representation ensures that the positive interpolation of $A_k$ will result in a diagonal matrix for the system matrix A(ρ(t)) with negative real diagonal elements at every scheduling parameter sample. In certain embodiments, the mathematical setup of the LPV representation guarantees stability of the system matrix A(ρ(t)).

In certain embodiments, the mathematical setup provides that the scheduling parameter samples are drawn from the same polynomial construct as the system matrix A(ρ(t)). In certain embodiments, for example, the mathematical setup of the LPV representation guarantees the consistency of the state spaces as a function of scheduling parameter samples.

In certain embodiments, first a search for an optimal stable parameter varying system matrix Ã(ρ(t)) is sought where a canonical state-space representation is assumed. This is done by solving a global optimization problem that minimizes the output error between a global training data and the state-space LPV of for example positive polynomial type.

In certain embodiments, a search for an optimal parameter varying residue C̃(ρ(t)) and feed-forward D̃(ρ(t)) matrices by solving a convex optimization problem that uses the optimal stable parameter varying system matrix Ã(ρ(t)), that minimizes the output error between a global training data and state-space LPV of for example positive polynomial type subject to also staying within a prescribed threshold of a set of local step response training data. The [Ã(ρ(t)), B̃(ρ(t)), C̃((ρ(t)), D̃(ρ(t))] will formulate the state-space LPV ROM identified.

The methods and systems described herein may be implemented using any suitable processing system with any suitable combination of hardware, software and/or firmware, such as described below with reference to the non-limiting examples of FIGS. 12A, 12B, 12C, and 13.

Figure 12A:
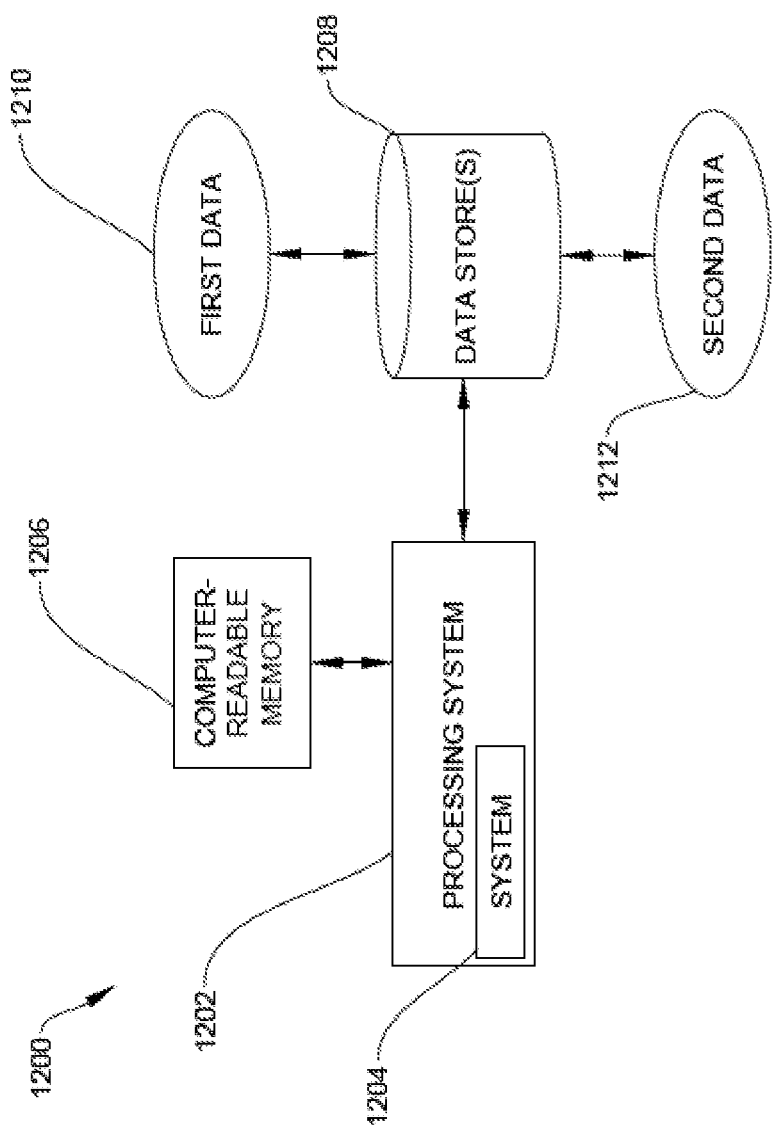
FIGS. 12A-12C and 13 are schematic depictions of example systems that may be used to implement the technology disclosed herein.
Figure 12B:
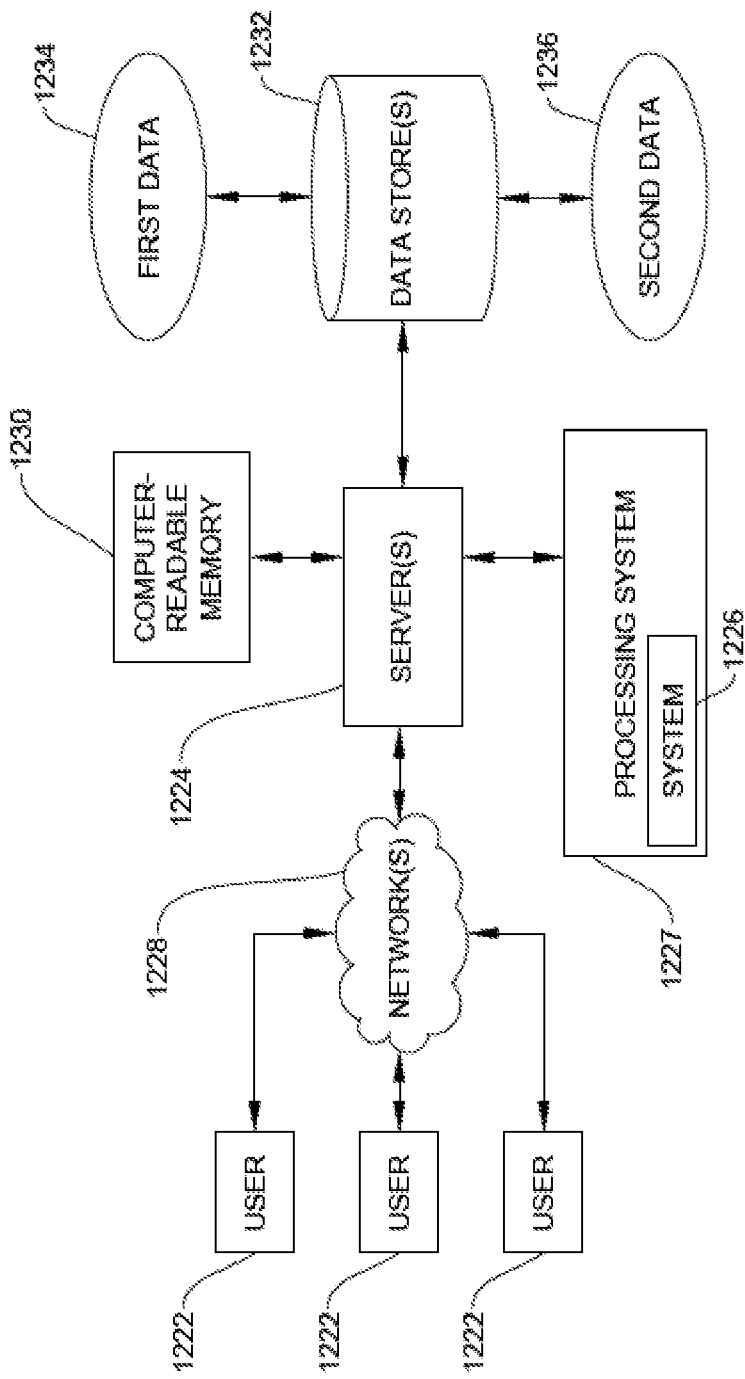
Figure 12C:
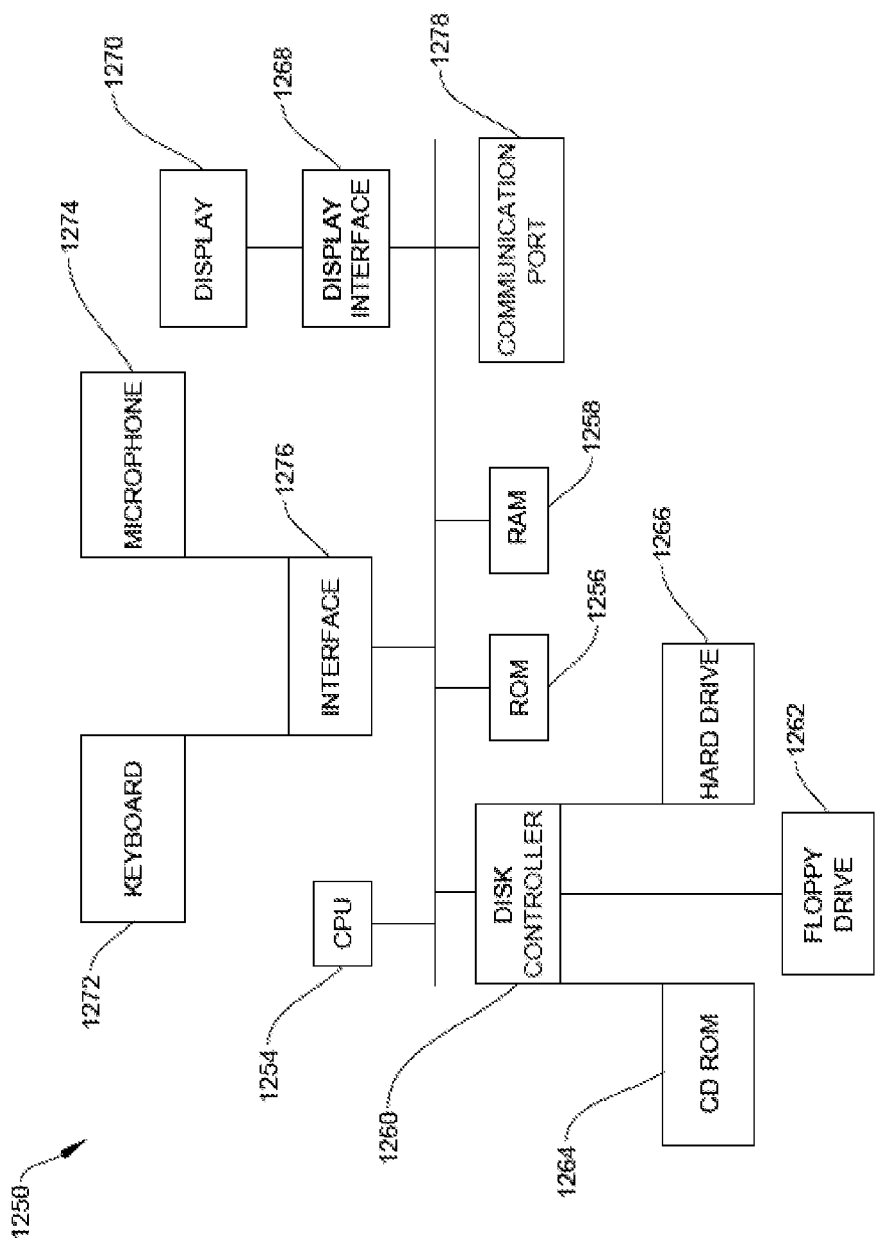

FIGS. 12A, 12B, and 12C depict example systems for use in implementing a system. For example, FIG. 12A depicts an exemplary system 1200 that includes a standalone computer architecture where a processing system 1202 (e.g., one or more computer processors) includes a system 1204 being executed on it. The processing system 1202 has access to a non-transitory computer-readable memory 1206 in addition to one or more data stores 1208. The one or more data stores 1208 may contain first data 1210 as well as second 1212.

FIG. 12B depicts a system 1220 that includes a client server architecture. One or more user PCs 1222 accesses one or more servers 1224 running a system 1226 on a processing system 1227 via one or more networks 1228. The one or more servers 1224 may access a non-transitory computer readable memory 1230 as well as one or more data stores 1232. The one or more data stores 1232 may contain first data 1234 as well as second data 1236.

FIG. 12C shows a block diagram of exemplary hardware for a standalone computer architecture 1250, such as the architecture depicted in FIG. 12A, that may be used to contain and/or implement the program instructions of system embodiments of the present invention. A bus 1252 may serve as the information highway interconnecting the other illustrated components of the hardware. A processing system 1254 labeled CPU (central processing unit) (e.g., one or more computer processors), may perform calculations and logic operations required to execute a program. A non-transitory computer-readable storage medium, such as read only memory (ROM) 1256 and random access memory (RAM) 1258, may be in communication with the processing system 1254 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a nontransitory computer-readable storage medium.

A disk controller 1260 interfaces one or more optional disk drives to the system bus 1252. These disk drives may be external or internal floppy disk drives such as 1262, external or internal CD-ROM, CD-R, CD-RW or DVD drives such as 1264, or external or internal hard drives 1266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1260, the ROM 1256 and/or the RAM 1258. Preferably, the processor 1254 may access each component as required.

A display interface 1268 may permit information from the bus 1256 to be displayed on a display 1270 in audio, graphic, or alphanumeric format. Communication with external devices may optionally occur using various communication ports 1272.

In addition to the standard computer-type components, the hardware may also include data input devices, such as a keyboard 1272, or other input device 1274, such as a microphone, remote control, pointer, mouse and/or joystick.

Figure 13:
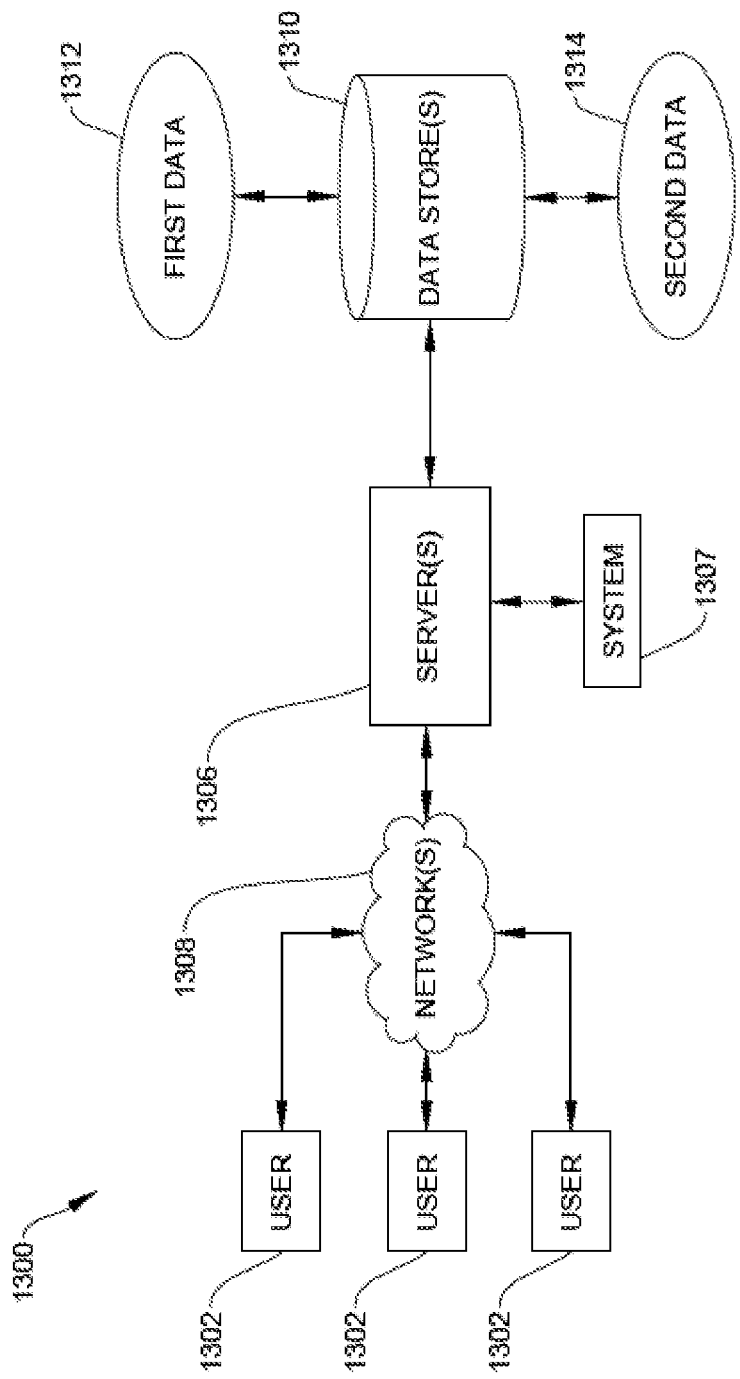

FIG. 13 depicts at 1300 a computer-implemented environment wherein users 1302 can interact with a system 1304 hosted on one or more servers 1306 through a network 1308. The system 1304 contains software operations or routines. The users 1302 can interact with the system 1304 through a number of ways, such as over one or more networks 1308. One or more servers 1306 accessible through the network(s) 1308 can host system 1304. It should be understood that the system 1304 could also be provided on a stand-alone computer for access by a user.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. In particular embodiments, a non-transitory computer- or machine-readable medium may be encoded with instructions in the form of machine instructions, hypertext markup language based instructions, or other applicable instructions to cause one or more data processors to perform operations. As used herein, the term "machine-readable medium" (or "computer-readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

INCORPORATION BY REFERENCE

Without limitation, the following documents are hereby incorporated, in their entirety, by reference: Asgari, S. et al., "A Linear Parameter Varying Combined with Divide-and-Conquer Approach to Thermal System Modeling of Battery Modules," *SAE Int. J. Alt. Power* 5:1 (May 2016); Lovera, M. et al., "Identification for gain-scheduling: A balanced subspace approach," *Proc. of the 2007 Am. Control Conf.* (July 2007) 858-863; Laub, A et al. "Computation of system balancing transformations and other applications of simultaneous diagonalization algorithms," *IEEE Transactions on Automatic Control* 32 (1987) 115-122; Grivet-Talocia S., "The Time-Domain Vector Fitting Algorithm for Linear Macromodeling," *AEÜ. Int. J. of Elec. and Commc'n* 58 (2004) 293-295; Asgari S. et al., "Fast and Reliable Macromodeling for Heat Flows under the Linear Time-Invariant Assumption," *NAFEMS World Conf. Proc.* (May 2011); Lovera, M. et al., "Guest Editorial Special Issue on Applied LPV Modeling and Identification," *IEEE Transactions on Control Sys. Tech.* 19:1 (January 2011); "Feedback Control Systems," *MIT OpenCourseWare* 16:30-31 (2010); Rowell, D. "Time-Domain Solution of LTI State Equations," *Analysis and Design of Feedback Control Sys.* 2:14 (October 2002); Gustaysen, B. et al., "Rational Approximation of Frequency Domain Responses by Vector Fitting," *IEEE Trans. Power Delivery* 14:3 (1999) 1052-1061; and Rowell, D. "State-Space Representation of LTI Systems," *Analysis and Design of Feedback Control Sys.* 2:14 (October 2002) (collectively, the "INCORPORATED REFERENCES").

Figure 14:
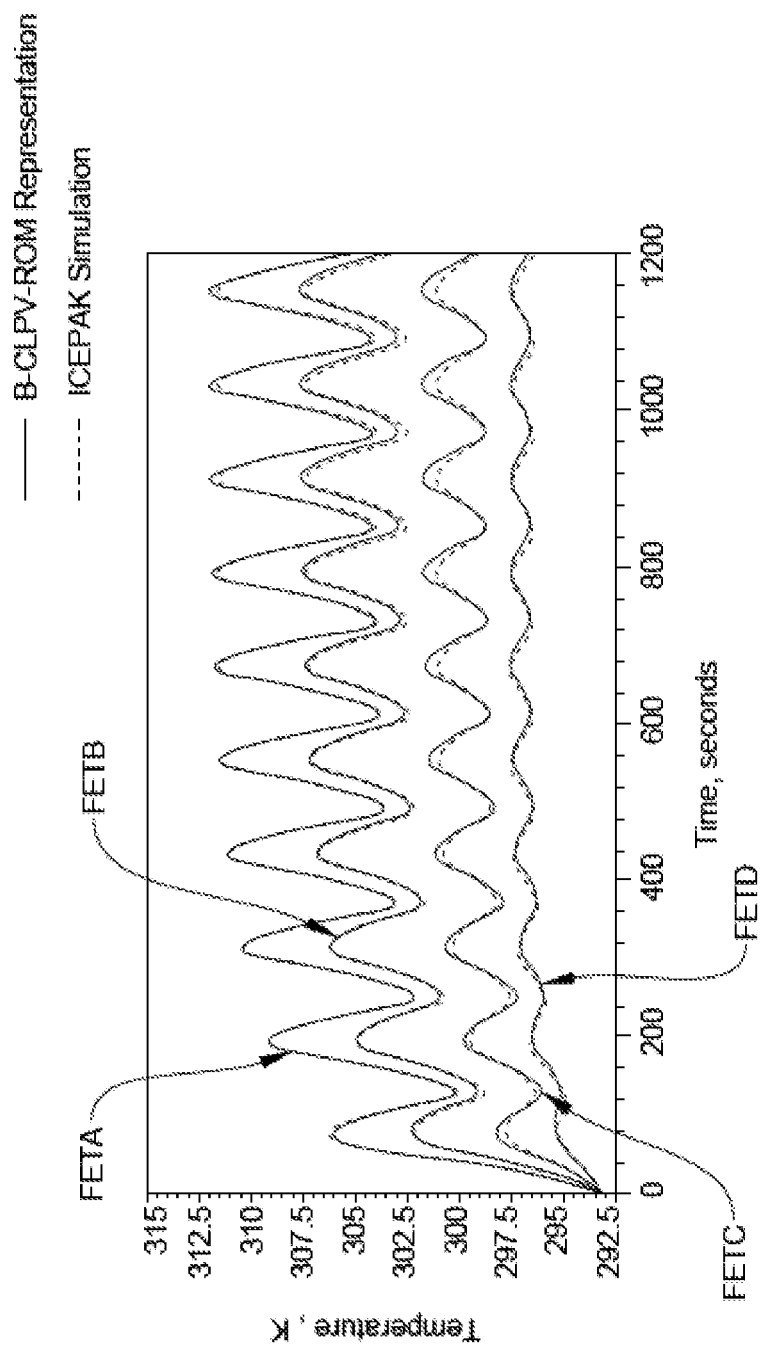
FIG. 14 is a plot of temperature profiles obtained by computer-implemented methods.
Figure 15:
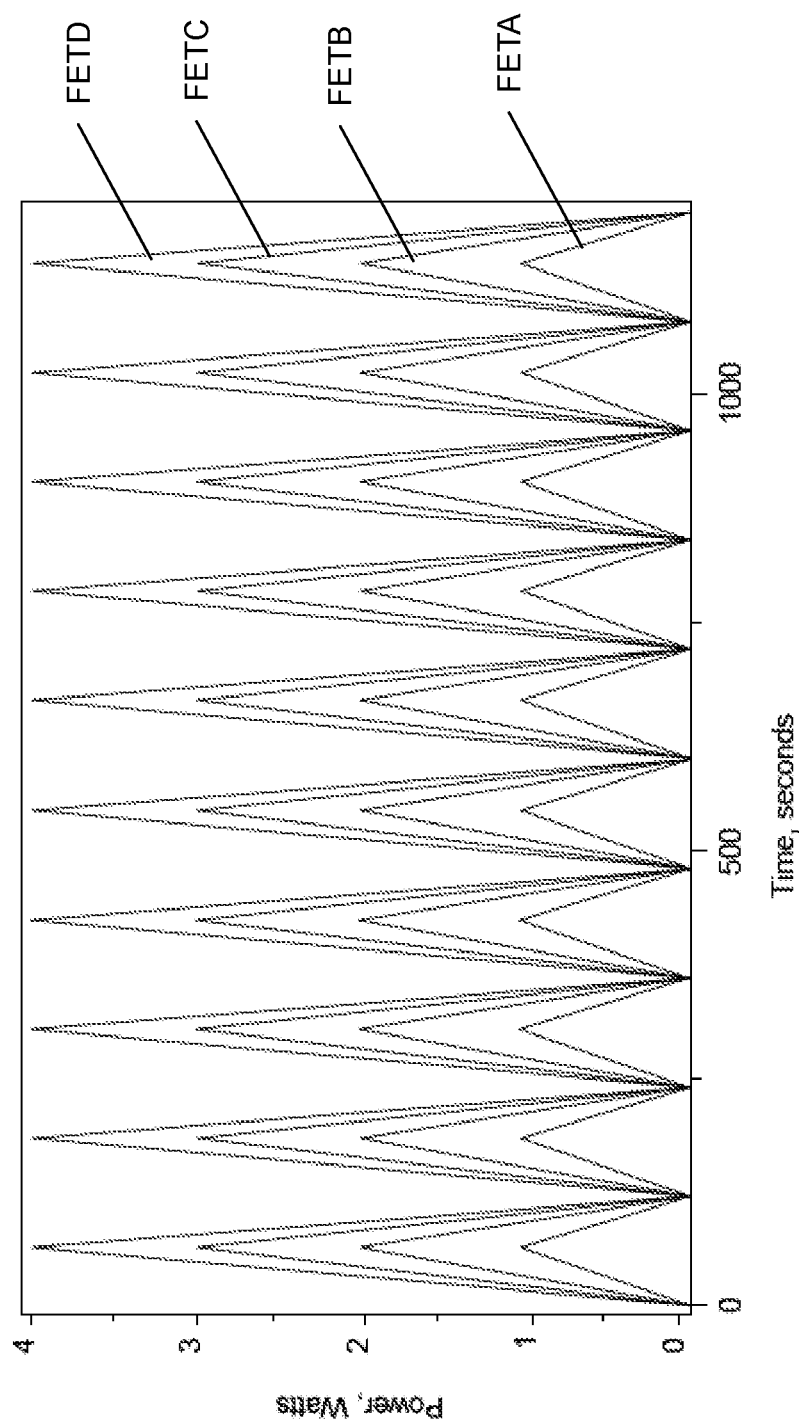
FIG. 15 is a plot of power inputs.
Figure 16:
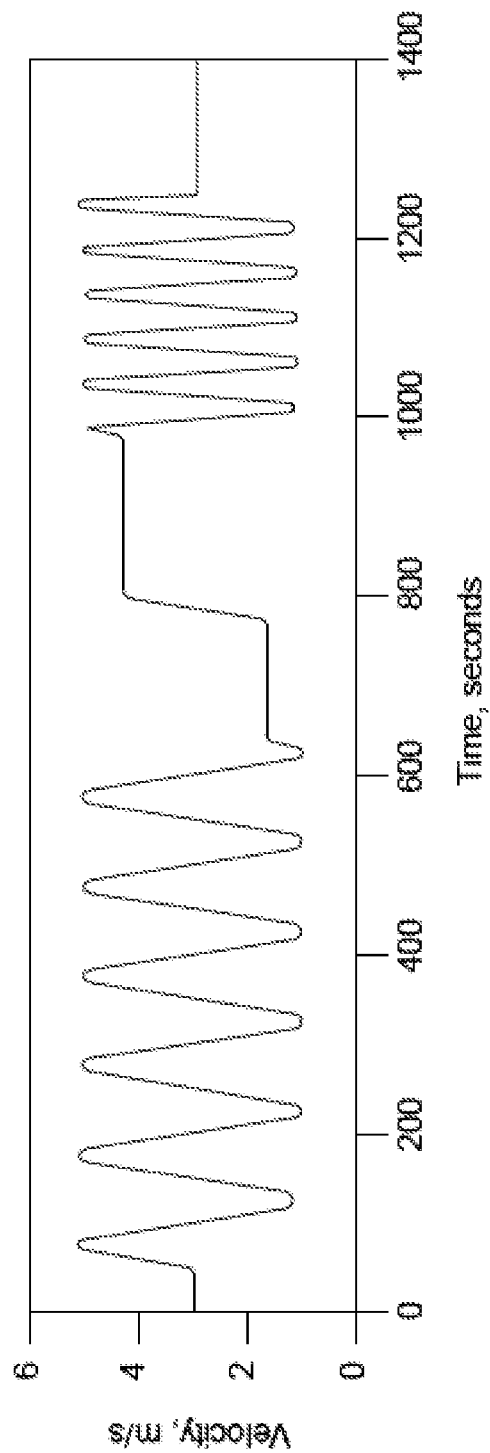
FIG. 16 is a plot of air velocity.

FIG. 14 compares a B-CLPV-ROM (block matrix-canonical LPV-ROM) representation of the electronics package 100 with ICEPAK computational fluid dynamics simulations performed with a constant scheduling parameter value of 1.5 m/s and the power input scenarios shown in FIG. 15. The B-CLPV-ROM was generated by building a separate CLPV-ROM representation (i.e., a single input-multiple output representation) for each of the inputs FETA-FETD using the methods 1000 and 1100, and combining the separate CLPV-ROM representations to form the B-CLPV-ROM representation using the method 500. Training data for each CLPV-ROM was generated using ICEPAK, with each input excitation consisting of a 1-Watt step input at the beginning of each ICEPAK simulation and with the scheduling parameter scenario shown in FIG. 16.

In the descriptions above and in the claims, phrases such as "at least one of" or "one or more of" may occur followed by a conjunctive list of elements or features. The term "and/or" may also occur in a list of two or more elements or features. Unless otherwise Implicitly or Explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in methods, systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   i) providing a computer aided design (CAD) software system executing a computer-implemented model configured to simulate outputs of a physical system relating to thermal modeling in response to each of a plurality of inputs, the plurality of inputs each having an associated input and an associated scheduling parameter, the outputs comprising temperatures at one or more locations in the physical system, each input comprising a respective energy input, and the associated scheduling parameters each comprising a respective flow rate of coolant or air flow for the physical system, the physical system comprising a battery pack or a circuit board;
   ii) running, for each input, the computer-implemented model at a plurality of fixed values of the associated scheduling parameter to obtain output responses to excitations of the input at the plurality of fixed values of the associated scheduling parameter;
   iii) fitting, for each input, Linear Time Invariant representations (LTI representations) to the corresponding output responses, the LTI representations having state-space variables characterized by negative real poles;
   iv) updating, for each input, coefficient matrices of the corresponding LTI representations, comprising:
      a) rearranging the coefficient matrices so that the negative real poles appear in ascending or descending arrangements in the coefficient matrices;
      b) applying balancing transformations to the coefficient matrices; and
      c) detecting and removing sign changes in the LTI representations caused by the balancing transformations;
   v) constructing, for each input, a Linear Parameter Varying-Reduced Order Model (LPV-ROM) representation that includes the scheduling parameter, comprising: multiplying the updated coefficient matrices by interpolation functions for the associated scheduling parameter;
   vi) repeating, for each input, steps iii-v with an increased number of the state-space variables if a measure of prediction error of the corresponding LPV-ROM representation exceeds a predetermined threshold;
   obtaining experimental measurements for each of the plurality of inputs based on experiments conducted on the physical system;
   generating training data for each of the plurality of inputs using the experimental measurements obtained from the physical system;
   calibrating, for each input, the corresponding LPV-ROM using the training data;

combining the calibrated LPV-ROMs to form an overall LPV-ROM to model the physical system; and simulating thermal properties of the physical system based on the overall LPV-ROM by using each of the calibrated LPV-ROMs, the simulating being used for controlling the thermal properties of the physical system.

2. The method of claim 1, wherein each LPV-ROM representation comprises a diagonal system matrix.

3. The method of claim 2, wherein each LPV-ROM representation comprises an input matrix that consists of a column vector of 1's.

4. The method of claim 3, wherein each block of the block-matrix combination of LPV representations comprises a different input.

5. The method of claim 1, wherein the number of the state-space variables is between 2 and 8 state-space variables.

6. The method of claim 1, wherein the excitation of the input is a step input.

7. The method of claim 1, wherein the fitting comprises time domain vector fitting.

8. The method of claim 1, wherein each LPV-ROM representation comprises real, negative poles over a predetermined range of the scheduling parameter.

9. The method of claim 1, wherein the measure of prediction error of each LPV-ROM representation comprises a norm of the differences between output predictions of the LPV-ROM representation and the corresponding output responses of the training data.

10. The method of claim 1, wherein the interpolation functions are piece-wise linear functions.

11. A method for implementation by one or more computing systems comprising:
conducting experiments on a physical system to obtain experimental measurements, the physical system comprising a battery pack or a circuit board; and
simulating thermal properties of the physical system using a computer aided design (CAD) software system initializing an overall Linear Parameter Varying-Reduced Order Model (LPV-ROM) representation of the physical system, the simulating being used for controlling the thermal properties of the physical system;
wherein the overall LPV-ROM is constructed by:
i) providing a computer-implemented model configured to simulate outputs of the physical system in response to each of a plurality of inputs, the plurality of inputs each having an associated input and an associated scheduling parameter, the outputs comprising temperatures at one or more locations in the physical system, the input comprising an energy input, and the associated scheduling parameter comprising a flow rate of coolant provided to the physical system;
ii) running, for each input, the computer-implemented model at a plurality of fixed values of the associated scheduling parameter to obtain output responses to excitations of the input at the plurality of fixed values of the associated scheduling parameter;
iii) fitting, for each input, Linear Time Invariant representations (LTI representations) to the output responses, the LTI representations having state-space variables characterized by negative real poles;
iv) updating, for each input, coefficient matrices of the corresponding LTI representations, comprising:
a) rearranging the coefficient matrices so that the negative real poles appear in ascending or descending arrangements in the coefficient matrices;
b) applying balancing transformations to the coefficient matrices; and
c) detecting and removing sign changes in the LTI representations caused by the balancing transformations;
v) constructing, for each input, an LPV-ROM representation that includes the scheduling parameter, comprising: multiplying the updated coefficient matrices by interpolation functions for the associated scheduling parameter the LPV-ROM representation being a block-matrix combination of LPV-ROM representations generated for excitations of different inputs;
vi) repeating, for each input, steps iii-v with an increased number of the state-space variables if a measure of prediction error of the LPV-ROM representation exceeds a predetermined threshold;
vii) generating training data for each of the plurality of inputs using the experimental measurements obtained from the physical system; and
vii) calibrating, for each input, the corresponding LPV-ROM using the training data, the simulating using each of the calibrated LPV-ROMs;
viii) combining calibrated LPV-ROMs to form the overall LPV-ROM to model the physical system.

12. The method of claim 11, wherein each LPV-ROM representation comprises a diagonal system matrix.

13. The method of claim 12, wherein each LPV-ROM representation comprises an input matrix that consists of a column vector of 1's.

14. The method of claim 13, The method of claim 3, wherein each block of the block-matrix combination of LPV-ROM representations comprises a different input.

15. The method of claim 11, wherein the number of the state-space variables is between 2 and 8 state-space variables.

16. The method of claim 11, wherein the excitation of the input is a step input.

17. The method of claim 11, wherein the fitting comprises time domain vector fitting.

18. The method of claim 11, wherein each LPV-ROM representation comprises real, negative poles over a predetermined range of the scheduling parameter.

19. The method of claim 11, wherein the measure of prediction error of each-LPV-ROM representation comprises a norm of the differences between output predictions of the LPV-ROM representation and the corresponding output responses of the training data.

20. The method of claim 11, wherein the interpolation functions are piece-wise linear functions.

* * * * *